United States Patent
Koide et al.

(10) Patent No.: US 6,634,734 B1
(45) Date of Patent: Oct. 21, 2003

(54) METHOD FOR MANUFACTURING INK JET RECORDING HEAD, INK JET RECORDING HEAD MANUFACTURED BY SUCH METHOD, AND LASER WORKING METHOD

(75) Inventors: Jun Koide, Tokyo (JP); Yoshiaki Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 09/605,425

(22) Filed: Jun. 28, 2000

(30) Foreign Application Priority Data

| Jun. 30, 1999 | (JP) | ............ 11-184623 |
| Nov. 30, 1999 | (JP) | ............ 11-339327 |
| Nov. 30, 1999 | (JP) | ............ 11-339334 |
| Jun. 2, 2000 | (JP) | ............ 2000-165454 |

(51) Int. Cl.$^7$ ................................. B41J 2/16
(52) U.S. Cl. .................................... 347/47
(58) Field of Search ............... 347/47, 45, 65, 347/258, 207; 29/890.1, 890.11

(56) References Cited

U.S. PATENT DOCUMENTS

| 4,929,256 A | 5/1990 | Shepherd .................. 51/293 |
| 5,208,604 A | 5/1993 | Watanabe et al. ........... 347/47 |
| 5,703,631 A | * 12/1997 | Hayes et al. ............... 347/47 |
| 5,946,024 A | * 8/1999 | Nishiwaki ................. 347/258 |

FOREIGN PATENT DOCUMENTS

| JP | 6-24874 B2 | 4/1989 |
| JP | 2-121842 | 5/1990 |
| JP | 2-121845 | 5/1990 |
| WO | WO 93/12937 | 7/1993 |

* cited by examiner

Primary Examiner—Lamson Nguyen
Assistant Examiner—K. Feggins
(74) Attorney, Agent, or Firm—Fitzpatrick, Cella, Harper & Scinto

(57) ABSTRACT

A method for manufacturing an ink jet recording head in which an ink discharge port for discharging an ink droplet to be adhered to a recording medium, a liquid chamber for containing ink to be supplied to the ink discharge port, an ink low path for communicating the ink discharge port with the liquid chamber, an energy generating element provided in the ink flow path and adapted to generate energy for discharging the ink and an ink supply opening for supplying the ink from exterior into the liquid chamber are formed by bonding or adhering plate members. In the method when an orifice plate in which the ink discharge port is formed is subjected to laser working, a laser light of plural pulses having very great spatial and time energy density and emitted from a laser oscillator for oscillating the laser light at a pulse emitting time smaller than 1 pico-second is used, and the laser beam is illuminated from an outer surface side of the orifice plate which is opposite to an ink supplying side thereby to form an ink discharge port working pattern on the outer surface of the orifice plate by focus projection.

11 Claims, 18 Drawing Sheets

METHOD FOR MANUFACTURING INK JET RECORDING HEAD, INK JET RECORDING HEAD MANUFACTURED BY SUCH METHOD, AND LASER WORKING METHOD

BACKGROUND OF THE INVENTION

1. Field of the Invention

The present invention relates to a method for manufacturing an ink jet recording head for flying an ink droplet to adhere it onto a recording medium, an ink jet recording head manufactured by such a method, and a laser working method.

2. Related Background Art

In ink jet printing, print quality greatly depends upon a property of a nozzle portion for discharging, ink, and the property of the nozzle portion is determined by dispersion in nozzle diameters and shapes of nozzles. As methods for forming the nozzles, generally two methods, i.e., electrical discharge machining utilizing electroforming using a metallic plate, and, ultraviolet laser working method in which organic polymer resin material is subjected to sublimation by high energy laser such as excimer laser have been proposed. Presently, the latter method, i.e., ultraviolet laser working method has mainly been used for micro working.

In the past, when the organic polymer resin material is subjected to sublimation by the ultraviolet laser, a taper shaped working property in which worked area is gradually decreased from a laser input side to a laser output side by illuminating a laser onto the material has been achieved. By the way, in the ink jet recording head, in order to improve print quality, since a nozzle plate including nozzles tapered toward ink discharge side is required as a nozzle plate having discharge ports, when the nozzle plate is manufactured, the above-mentioned laser working method is used, and, in this case, after the nozzles are formed by illuminating the laser onto the nozzle plate from the ink supplying side, the nozzle plate is connected to an ink supplying member.

However, a length of the nozzle is required to be within a range from several tends of $\mu$m to about 100 $\mu$m to improve the print quality, add, thus, a thickness of the nozzle plate has the same dimension. Therefore, since the nozzle plate is very deformable and since the nozzle plate must be laser-worked from the ink supplying side as mentioned above and since the nozzle plate must be connected to the ink supplying member after nozzles were formed in the plate, after the connection, the nozzle plate is deformed by stress. Due to the stress deformation, the ink discharge nozzles which are aligned with each other in the same direction cannot be formed, with the result that ink discharging directions do not become the same, thereby deteriorating the print quality.

In order to solve such a problem, as a method for forming the ink discharge nozzles after the ink jet recording head is assembled, the following methods have been proposed.

One method is disclosed in National Publication of International Patent Application No. 6-510958. In this method, light beams regulated by mask patterns are obliquely incident on a discharge port forming plate so that the plate is worked along the light beam advancing directions due to the oblique incidence, with the result that a nozzle plate including tapered nozzles each having a wider inside width than an outside width is formed.

Another method is disclosed in Japanese Patent Publication No. 6-24874. In this method, a light beam is illuminated in a condition that a mask plate having a nozzle pattern is closely contacted with an ink discharge port forming plate. In this case, the mask plate and the ink discharge port forming plate which are closely contacted with each other are rocked or pivoted so that the light beam is obliquely incident on the plates, with the result that nozzles tapered toward outside are formed in the ink discharge port forming plate by advancing the working along the beam incident direction.

However, in the method disclosed in the National Publication of International Patent Application No. 6-510958, because of two-directional beam working, although the nozzles tapered toward outside are formed in the nozzle plate in the beam incident directions, regarding directions perpendicular to the beam incident directions, since nozzles flared toward outside are formed and cone-shaped tapers symmetrical with respect to the ink discharging direction are not formed, in the direction of the taper flared toward outside, ink discharging fluid resistance is generated to delay period of ink discharge, thereby making high speed printing impossible, and, further, in case of the flared nozzles, mist is generated during the ink discharging.

Further, also in the method disclosed in the Japanese Patent Publication No. 6-24874, since the mask plate and the ink discharge port forming plate are inclined with respect to the light beam in a time-lapse manner, in a working start condition and a working finish condition, i.e., in a time-lapse working process, it becomes difficult to form the tapers symmetrical with respect to the ink discharging direction, with the result that it is difficult to fly ink droplets stably in the given direction in the respective ink jet recording heads.

In the past, as a laser working method for micro-working a structure requiring minute construction and high accuracy, an ultraviolet laser working method has been used.

An example of such micro-working include formation of ink paths and ink discharge ports of an ink jet head.

In Japanese Patent Application Laid-Open No. 2-121842 or Japanese Patent Application Laid-Open No. 2-121845, a technique in which ink paths and ink discharge ports are formed with high accuracy by using an excimer laser which is typical as the ultraviolet laser is disclosed.

That is to say, the excimer laser is a laser in which an ultraviolet light (radiation) having short pulse (15 to 35 ns) is generated by discharge-exciting mixed gas of rare gas and halogen gas, and oscillation energy of the laser is several hundreds mJ/pulse and pulse repeating frequency is 10 to 500 Hz. When short pulse ultraviolet light having high luminance such as excimer laser light is illuminated onto a surface of polymer resin, ablative photodecomposition (APD) phenomenon in which the illuminated portion is instantaneously decomposed and scattered with plasma flash and shock noise is generated, thereby permitting so-called laser abrasion working of polymer resin.

In a YAG laser which was previously used in the laser working, although a hole can be formed, there is a disadvantage that an edge face is made rough. Further, in a $CO_2$ laser, there is a disadvantage that craters are formed around a hole. Since such laser working is laser heat working in which working is effected by converting optical energy into thermal energy, worked configuration is apt to be destroyed and it is difficult to effect micro-working. To the contrary, in the laser abrasion working using the excimer laser, since sublimation etching is effected by photo-chemical reaction for breaking covalent bond of carbon atoms, the worked configuration is hard to be destroyed and high accurate working can be achieved.

The laser abrasion working means a method for effecting sublimation working by the laser without liquid-state condition.

Particularly in the ink jet technical field, remarkable progress is achieved by utilizing the laser abrasion working using the excimer laser.

As the laser working techniques using the excimer laser have been put to practical use, the following facts are recognized.

That is to say, the oscillation pulse time of the illumination laser is about several tends ns (nano-seconds) regarding the excimer laser as the ultraviolet laser and from about 100 pico-seconds to several ns regarding ultraviolet ray of high harmonic oscillation of YAG laser, and, it was found that optical energy of the laser light illuminated onto the workpiece is not totally used for breaking of the covalent bond of atoms.

And, by the presence of optical energy which is not used for breaking of the covalent bond of atoms, the laser-worked portion of the workpiece is scattered before it is completely decomposed, with the result that by-product is generated around the worked portion.

Further, a part of the optical energy which is not used for breaking of the covalent bond of atoms is converted into thermal energy.

Since energy density of the excimer laser is 100 mega-Watts at the maximum in the oscillation pulse, metals having high heat conductivity, ceramics, minerals (such as silicon), and quarts and glass having low light absorption are hard to be worked, and only organic resin materials can be subjected to sublimation abrasion working.

These are inevitable phenomena caused by using the excimer laser, and various techniques in which such phenomena are prevented from affecting an influence upon the actual head have been proposed.

For example, if the ink jet recording head is assembled in a condition that the by-products remain, since clogging of discharge ports will occur, a new step for removing the by-products was added.

Further, when the part of the optical energy is converted into the thermal energy, the work piece is thermally expanded during the working or partially melted, material having high glass transition point was used or working pitch was reduced.

In this way, since the above-mentioned techniques could not solve the problems completely, there were various limitations in the laser working.

On the other hand, in the above-mentioned ink jet recording head, recently, highly fine image quality has been requested. Regarding this, although arrangement density of the discharge ports and ink flow paths of 300 to 400 dpi was adequate conventionally, in recent years, arrangement density of 600 dpi or 1200 dpi has been requested.

To this end, a forming method for forming minute interval (distance) such as arrangement interval (distance) (between the discharge ports and the recording liquid flow paths) equal to or smaller than 50 μm or minute configuration such as working diameter equal to or smaller than 20 μm with high accuracy has been requested.

However, since the above-mentioned phenomena found in the excimer laser become remarkable as the working distance and the working diameter becomes smaller, the excimer laser has limitation in the manufacture of the highly fine head.

The inventors recognize that all of the phenomena are based on the laser abrasion working using the ultraviolet laser (such as excimer laser) and found, from new investigations apart from conception of conventional techniques, an epochal laser abrasion working technique which can eliminate such phenomena completely and cope with microworking techniques which will be proposed in the future and improve general-purpose application.

Further, in the conventional ink jet recording heads, since the ink supply paths and the ink discharge ports cannot be interconnected smoothly and velocity vector of ink operation is directed only toward the flying direction, print quality is deteriorated.

That is to say, the ink discharge ports of the ink jet recording head applied to the ink jet recording system are formed in the plate or plate portion as cone-shaped or polygonal pyramid-shaped holes tapered toward the ink discharging direction, and the ink droplet is flown by a method in which ink liquid interface is formed on a surface of the ink discharge side by liquid surface tension obtained by making the interior of the ink discharge port hydrophilic (to the liquid ink) and giving water repelling property to the edge of the port and therearound and pressure is applied to the liquid ink by a mechanical deforming (displacement) element or a thermal bubbling element to expel the liquid ink stored in the ink jet head. Further, a method in which ink liquid interface is formed on a boundary area between the hydrophilic area and the water repelling area by giving water repelling property up to a predetermined zone within the discharge port and the ink liquid droplet is flown in the similar manner has been proposed.

However, in the conventional laser working, since three-dimensional working of the cone shape having working section changed from a second configuration to a first configuration cannot be effected, also in the ink jet recording head, the ink supply paths cannot be smoothly connected to the ink discharge ports, with the result that turbulent flows are generated in corners of the ink discharge ports at ink supply sides thereof. Consequently, error of dot placement accuracy of the ink droplets becomes great, and, since mist is generated around the ink droplets not to obtain the complete circular print dots, thereby deteriorating the print quality.

Further, in the conventional ink jet recording head, since the velocity vector of the liquid ink operation is directed only toward the flying direction, portions which are subjected to fluid resistance at the wall surfaces of the discharge nozzles are apt to be deviated from the flying direction, with the result that the error of dot placement accuracy of the ink droplets becomes great, and, since mist is generated around the ink droplets not to obtain the complete circular print dots, thereby deteriorating the print quality.

To improve this inconvenience, if the discharge nozzle can be formed as spiral or helical configuration, the ink droplet can have rotational component around the axis of the flying direction so that the ink droplet can stably flying by rotational inertia, thereby solving the above problem. However, in the conventional laser working techniques, for example, it is impossible to obtain spiral cone shape having polygonal bottom configuration connected to circular, elliptical or polygonal configuration merely by illuminating the laser beam from the excimer laser onto the workpiece.

Further, in the conventional ink jet recording heads, the ink mist remains in the ink discharge ports, which affects a bad influence upon the ink flying. That is to say, in the conventional ink jet recording heads, when the ink is flown as mentioned above, if a main droplet of the ink droplet and sub-droplet (called as satellite) following the main droplet are both flying along the symmetrical axis of the ink discharge port, high accurate print quality can be obtained. However, when the number of ink discharge operations is increased, the ink mist remains or accumulates in the ink discharge port, which affects a bad influence upon the ink flying. To avoid this, wiping means such as a wiper capable of removing such ink mist adhered to the ink discharge port is required. If the ink liquid interface formed on the ink discharge side surface is wiped by using such a wiper, the ink discharge surface edge of the ink discharge port which has an important role for determining the ink flying direction will be damaged or the water repelling film will be peeled, with the result that the performance of the ink jet recording head is worsened.

Further, the ink is normally solved in aqueous solution. If the ink jet recording head are not used for a long term, moisture is vaporized from the ink solution, with the result that the ink discharge port will be clogged due to solidification of ink. Thus, when the ink jet recording head is left as it is for a predetermined time period or more, the ink must be sucked from the ink discharge side in order to avoid the clogging of the ink discharge port.

Such an ink sucking operation leads to not only excessive ink consumption but also prevention of immediate print start. Although such a problem can be solved by capping the ink discharge ports by a cap, when the cap is closely contacted with the ink discharge port surface, bubbles are apt to be entered into the ink nozzles, and, in order to closely contact the cap with the ink discharge port surface, elastic material following the ink discharge port surface is required. To this end, although it is considered that material such as rubber or urethane is used for forming the cap, since such material is apt to be degenerated by alkali of ink, if such material is used as the cap, the material is degenerated to adhere to the ink discharge ports to change the ink flying direction.

Further, in the above-mentioned method in which ink liquid interface is formed on a boundary area between the hydrophilic area and the water repelling area by giving water repelling property up to a predetermined zone within the discharge port and the ink liquid droplet is flown in the similar manner, it is technically possible to prevent the clogging of the ink discharge ports due to solidification of ink by applying a cap to the ink discharge ports in such a manner that the cap is not contacted with the ink. However, regarding the flying direction of the ink droplet, although the ink droplet is flying along the symmetrical axis of the ink discharge port, in the satellite sub-droplet, when the ink leaves the ink discharge port, since the ink is pulled to a position where van der Waals force acts most strongly in dependence upon the flying condition at the area of the ink discharge port where the water repelling film is provided, the flying direction of the satellite sub-droplet is changed, with the result that the main droplet and the satellite sub-droplet do not fly in the same direction.

Further, since this problem depends upon the balance of delicate ink adhesion force at the water repelling surface within the ink discharge port, control thereof is difficult, and, whenever the ink is discharged, the flying direction of the satellite droplet is changed at random, with the result that, regarding the print quality, print density becomes unstable and noise such as image roughness is generated. Thus, the practical level is not reached.

If a configuration in which the cone-shaped portion flared toward the illumination side of the laser beam is connected to the cone-shaped portion flared toward the opposite direction with a symmetrical axis in common, by forming the ink liquid interface within the ink discharge port by the liquid surface tension of ink, the clogging of the ink discharge ports due to solidification of ink can be prevented by applying a cap to the ink discharge ports in such a manner that the cap is not contacted with the ink, and a discontinuous surface boundary can be formed at a boundary between the area extending toward the ink supply side (ink hydrophilic area) and the area extending toward the ink discharge side (ink repelling area), with the result that, by separating the ink flying droplet at the discontinuous surface boundary position, the main droplet and the satellite droplet of ink can always be flown along the symmetrical axis of the ink discharge port thereby to achieve high accurate printing and solve the above-mentioned problem. However, in the conventional laser working methods, for example, it is impossible to obtain the above-mentioned configuration merely by illuminating the laser light from the excimer laser onto the workpiece.

SUMMARY OF THE INVENTION

An object of the present invention is to provide an ink jet recording head manufacturing method, an ink jet recording, head manufactured by such a method, and a laser working method, which can solve the above-mentioned conventional problems, and in which a taper configuration symmetrical with respect to an axis of an ink discharging direction and totally tapered outwardly can be obtained by laser working from outside (ink discharge side) of an ink discharge port forming plate, and which can cope with highly fineness, and in which by-products are not formed and thermal energy converted during the laser working can be prevented from being accumulated on a workpiece such as resin.

Another object of the present invention is to provide an ink jet recording head manufacturing method, an ink jet recording head manufactured by such a method, and a laser working method, in which three-dimensional working of the cone shape having working section changed from a second configuration to a first configuration can be effected or spiral cone shape having polygonal bottom configuration connected to predetermined sectional configuration can be obtained or spiral cone shape having predetermined configuration connected to predetermined polygonal sectional configuration.

A further object of the present invention is to provide an ink jet recording head manufacturing method, an ink jet recording head manufactured by such a method, and a laser working method, in which a cone-shaped portion flared toward the illumination side of laser beam can be connected to a cone-shaped portion flared toward the opposite direction with a symmetrical axis in common thereby to prevent clogging of ink discharge ports due to solidification of ink, and a main droplet and a satellite droplet of ink can always be flown along a symmetrical axis of the ink discharge port thereby to achieve high accurate printing.

To achieve the above objects, the present invention provides an ink jet recording head manufacturing method, an ink jet recording head manufactured by such a method, and a laser working method, as defined by the following items (1) to (66).

(1) A method for manufacturing an ink jet recording head in which an ink discharge port for discharging an ink droplet to be adhered to a recording medium, a liquid chamber for containing ink to be supplied to the ink discharge port, an ink flow path for communicating the ink discharge port with the liquid chamber, an energy generating element provided in the ink flow path and adapted to generate energy for discharging the ink and an ink supply port for supplying the ink from exterior into the liquid chamber are formed by bonding or adhering plate members, wherein, when an orifice plate in which the ink discharge port is formed is subjected to laser working, a laser light of plural pulses having very great spatial and time energy density and emitted from a laser oscillator for oscillating the laser light at a pulse emitting time smaller than 1 pico-second is used, and the laser beam is illuminated from an outer surface side of the orifice plate which is opposite to an ink supplying side thereby to form an ink discharge port working pattern on the outer surface of the orifice plate by focus projection.

(2) A method for manufacturing an ink jet recording head according to (1), wherein a plurality of ink discharge ports are simultaneously formed at a predetermined interval by illuminating the laser light through a mask having a plurality of opening patterns formed at a predetermined pitch.

(3) A method for manufacturing an ink jet recording head in which an ink jet recording head for flying an ink droplet to be adhered to a recording medium by transmitting pressure to an ink discharge port by applying energy to ink by contacting the ink with a pressure generating source is formed by laser working, wherein, when an orifice plate in which the ink discharge port is formed is subjected to laser working, a laser light of plural pulses having very great spatial and time energy density and emitted from a laser oscillator for oscillating the laser light at a pulse emitting time smaller than 1 pico-second is used, and three-dimensional working of a cone shape having working section continuously changed from a second configuration to a first configuration is effected by illuminating a laser beam emitted from the laser oscillator onto the orifice plate under predetermined energy density and predetermined aperture number at a projection focus point of a mask pattern through the mask pattern having the second configuration different from the first configuration which is a beam section configuration at a non-focus point of the laser beam.

(4) A method for manufacturing an ink jet recording head according to (3), wherein the first configuration which is the beam section configuration at the non-focus point of the laser beam is a substantially polygonal configuration and the second configuration different from the first configuration in the mask pattern is a circular or elliptical configuration, and a cone shape in which a section configuration of the ink discharge side is a circular or elliptical configuration and a section configuration of the ink supply side is a substantially polygonal configuration is formed.

(5) A method for manufacturing an ink jet recording head according to (4), wherein the substantially polygonal configuration of the first configuration is formed by using a polygonal pupil image pattern of a projection lens.

(6) A method for manufacturing an ink jet recording head according to (4), wherein the substantially polygonal configuration of the first configuration is formed by using a polygonal stop pattern of a projection lens.

(7) A method for manufacturing an ink jet recording head according to any one of (3) to (6), wherein the section configuration of the ink supply side is formed as a substantially polygonal configuration smoothly connected to the ink supply path.

(8) A method for manufacturing an ink jet recording head according to (3), wherein the beam section configuration is a substantially polygonal configuration, and the three-dimensional working of a spiral cone shape spirally changed continuously while increasing a sectional area of a nozzle section configuration from the second configuration to the polygonal configuration is effected by illuminating the beam section configuration onto the orifice plate while rotating the beam section configuration around an optical axis, at the projection focus point of the mask pattern through the mask pattern having the second configuration.

(9) A method for manufacturing an ink jet recording head according to (8), wherein the spiral cone shape is formed as a spiral cone shape having a substantially polygonal bottom configuration gradually and smoothly twisted continuously.

(10) A method for manufacturing an ink jet recording head according to (8) or (9), wherein the spiral cone shape is worked by forming the polygonal configuration of the beam section configuration at the non-focus point of the laser beam by using the polygonal pupil image pattern of a projection lens and by rotating the pupil image pattern around the optical axis in connection with a working advancing direction of the workpiece.

(11) A method for manufacturing an ink jet recording head according to (8) or (9), wherein the spiral cone shape is worked by forming the polygonal configuration of the beam section configuration at the non-focus point of the laser beam by using the polygonal stop pattern of a projection lens and by rotating the stop pattern around the optical axis in connection with a working advancing direction of the workpiece.

(12) A method for manufacturing an ink jet recording head according to any one of (3) to (11), wherein the focus point is set at a surface side of the orifice plate directed toward the illumination side of the laser beam or at a position spaced apart from the surface side of the orifice plate directed toward the illumination side of the laser beam, whereby the three-dimensional working of the cone shape is effected.

(13) A method for manufacturing an ink jet recording head according to any one of (3) to (12), wherein, at the ink discharge port of the ink jet recording head, a water repelling film is formed in the vicinity of the ink discharge port at an ink discharge side thereof.

(14) A method for manufacturing an ink jet recording head in which an ink jet recording head for flying an ink droplet to be adhered to a recording medium by transmitting pressure to an ink discharge port by applying energy to ink by contacting the ink with a pressure generating source is formed by laser working, wherein, when an orifice plate in which the ink discharge port is formed is subjected to laser working, a laser light of plural pulses having very great spatial and time energy density and emitted from a laser oscillator for oscillating the laser light at a pulse emitting time smaller than 1 pico-second is used, and a configuration in which a cone-shaped portion flared toward the ink discharge side is connected to a cone-shaped portion flared toward the ink supply side with a symmetrical axis in common is worked by illuminating a predetermined pattern image by means of the laser beam emitted from the laser oscillator onto the orifice plate under predetermined energy density and predetermined aperture number at a projection focus point.

(15) A method for manufacturing an ink jet recording head according to (14), wherein the cone-shaped portion flared toward the ink discharge side is worked by setting the focus point at a position rearwardly of the ink discharge surface of the orifice plate, and the one-shaped portion flared toward the ink supply side is worked by setting the focus point at a portion where the cone-shaped portions are connected with the symmetrical axis in common, after the cone-shaped portion flared toward the ink discharge side is worked.

(16) A method for manufacturing an ink jet recording head according to (14) or (15), wherein a cone shape in which the cone-shaped portion flared toward the ink discharge side is greater than the one-shaped portion flared toward the ink supply side is formed.

(17) A method for manufacturing an ink jet recording head according to any one of (14) to (16), wherein the ink discharge port is formed by hydrophilic material.

(18) A method for manufacturing an ink jet recording head according to any one of (14) to (17), wherein a water repelling film is formed on a surface of the cone-shaped portion flared toward the ink discharge side and at an area in the vicinity of the ink discharge port at an ink discharge side thereof.

(19) A method for manufacturing an ink jet recording head according to (18), wherein the water repelling film is coated on the ink discharge side after the cone-shaped portion flared toward the ink discharge side is worked, and, thereafter, the one-shaped portion flared toward the ink supply side is worked.

(20) A method for manufacturing an ink jet recording head according to any one of (14) to (19), wherein the cone shape of the ink discharge port is formed in the cone-shaped portion.

(21) A method for manufacturing an ink jet recording head according to any one of (14) to (19), wherein the cone shape of the ink discharge port is formed in a polygonal pyramid portion.

(22) A method for manufacturing an ink jet recording head according to (21), wherein the polygonal pyramid portion is worked by using the laser beam having a polygonal beam section configuration.

(23) A method for manufacturing an ink jet recording head according to (22), wherein the polygonal beam section configuration of the laser beam is formed by using a polygonal pupil image pattern of the projection lens.

(24) A method for manufacturing an ink jet recording head according to (22), wherein the polygonal beam section configuration of the laser beam is formed by using a polygonal stop pattern of the projection lens.

(25) A method for manufacturing an ink jet recording head according to any one of (14) to (19), wherein the cone shape of the ink discharge port is formed in a spiral cone portion.

(26) A method for manufacturing an ink jet recording head according to (25), wherein the spiral cone portion is worked by illuminating the beam section configuration of the laser beam onto the workpiece while rotating around the optical axis.

(27) A method for manufacturing an ink jet recording head according to any one of (16) to (19), wherein the cone shape of the ink discharge port is worked in combination with the cone-shaped portion, polygonal pyramid portion or spiral cone portion.

(28) A method for manufacturing an ink jet recording head according to any one of (1) to (27), wherein the member for forming the ink discharge port is formed from resin.

(29) A method for manufacturing an ink jet recording head according to any one of (1) to (27), wherein the member for forming the ink discharge port is formed from Si or Si compound.

(30) A method for manufacturing an ink jet recording head according to any one of (1) to (27), wherein a wavelength of the laser light is within a range from 350 nm to 1000 nm.

(31) A method for manufacturing an ink jet recording head according to any one of (1) to (30), wherein a pulse emitting time of the laser light is 500 femto-seconds or less.

(32) A method for manufacturing an ink jet recording head according to any one of (1) to (31), wherein energy density of the laser beam satisfy the following relationship:

$$(a \times n \times E)/t > 13 \times 10^6 \ (W/cm^2)$$

where, a is absorbing rate of material of the workpiece with respect to the illumination laser wavelength, n is aperture number of an optical system for projecting the working pattern onto the workpiece at a side of the workpiece, E (unit: ($J/cm^2$/pulse)) is energy per unit oscillation pulse time per a unit area of the laser light illuminated on the material of the workpiece, and t (unit: (sec)) is time width of the oscillation pulse of the laser.

(33) A method for manufacturing an ink jet recording head according to any one of (1) to (32), wherein the laser oscillator has a space compressing device for light propagation.

(34) A method for manufacturing an ink jet recording head according to (33), wherein the space compressing device for light propagation is constituted by chirping pulse generating means, and longitudinal mode synchronizing means utilizing a light wavelength dispersing property.

(35) An ink jet recording head in which an ink discharge port for discharging an ink droplet to be adhered to a recording medium, a liquid chamber for containing ink to be supplied to the ink discharge port, an ink flow path for communicating the ink discharge port with the liquid chamber, an energy generating element provided in the ink flow path and adapted to generate energy for discharging the ink and an ink supply port for supplying the ink from exterior into the liquid chamber are formed by bonding or adhering plate members, wherein the ink discharge port of the ink jet recording head has a tapered section configuration in which a section configuration worked by focus-projecting an ink discharge port working pattern onto an outer surface of an orifice plate which is opposite to an ink supplying side by illuminating a laser beam of plural pulses having very great spatial and time energy density and emitted from a laser oscillator for oscillating the laser beam at a pulse emitting time smaller than 1 pico-second onto the outer surface of the orifice plate is tapered toward the outer surface of the orifice plate.

(36) An ink jet recording head according to (35), wherein a plurality of ink discharge ports are formed at a predetermined interval.

(37) An ink jet recording head for flying an ink droplet to be adhered to a recording medium by transmitting pressure to an ink discharge port by applying energy to ink by contacting the ink with a pressure generating source, wherein the ink discharge port of the ink jet recording head has a cone-shaped section configuration continuously changed from a second configuration to a first configuration worked by using a laser light of plural pulses having very great spatial and time energy density and emitted from a laser oscillator for oscillating the laser light at a pulse emitting time smaller than 1 pico-second so that an orifice plate is illuminated by illuminating a laser beam emitted from the laser oscillator under predetermined energy density and predetermined aperture number at a projection focus point of a mask pattern through the mask pattern having the second configuration different from the first configuration which is a beam section configuration at a non-focus point of the laser beam.

(38) An ink jet recording head according to (37), wherein a section configuration of the ink discharge port of the ink jet recording head at an ink discharge side thereof is circular or elliptical, and a section configuration at an ink supply side thereof is substantially polygonal.

(39) An ink jet recording head according to (38), wherein the section configuration at the ink supply side is formed as a substantially polygonal configuration smoothly connected to an ink supply path.

(40) An ink jet recording head according to (37), wherein the ink discharge port of the ink jet recording head has a continuous spiral cone shape gradually twisted smoothly and in which a section configuration of the ink discharge port of the ink jet recording head at an ink discharge side thereof is circular or elliptical, and a section configuration at an ink supply side thereof is substantially polygonal.

(41) An ink jet recording head according to (40), wherein the spiral cone shape is a spiral cone shape having a substantially polygonal continuous bottom configuration gradually twisted smoothly.

(42) An ink jet recording head according to any one of (37) to (41), wherein, at the ink discharge port of the ink jet recording head, a water repelling film is formed in the vicinity of the ink discharge port at the ink discharge side thereof.

(43) An ink jet recording head for flying an ink droplet to be adhered to a recording medium by transmitting pressure to an ink discharge port by applying energy to ink by contacting the ink with a pressure generating source, wherein the ink discharge port of the ink jet recording head has a section configuration in which a cone-shaped portion flared toward an ink discharge side is connected to a cone-shaped portion flared toward an ink supply side with a symmetrical axis in common.

(44) An ink jet recording head according to (43), wherein expansion of the cone-shaped portion flared toward the ink discharge side is greater than expansion of the cone-shaped portion flared toward the ink supply side.

(45) An ink jet recording head according to (43) or (44), wherein the ink discharge port is formed from hydrophilic material.

(46) An ink jet recording head according to any one of (43) to (45), wherein a water repelling film is formed on a surface of the cone-shaped portion flared toward the ink discharge side and at an area in the vicinity of the ink discharge port at an ink discharge side thereof.

(47) An ink jet recording head according to (46), wherein the water repelling film is coated on the ink discharge side after the cone-shaped portion flared toward the ink discharge side is worked, and, thereafter, the cone-shaped portion flared toward the ink supply side is worked.

(48) An ink jet recording head according to any one of (43) to (47), wherein the cone shape of the ink discharge port is formed in the cone-shaped portion.

(49) An ink jet recording head according to any one of (43) to (47), wherein the cone shape of the ink discharge port is formed in a polygonal pyramid portion.

(50) An ink jet recording head according to any one of (43) to (47), wherein the cone shape of the ink discharge port is formed in a spiral cone-shaped portion.

(51) An ink jet recording head according to any one of (43) to (47), wherein the cone shape of the ink discharge port is combined with a cone-shaped portion, a polygonal pyramid portion or a spiral cone-shaped portion.

(52) A laser working method for effecting laser abrasion working with respect to a workpiece by illuminating a laser beam to the workpiece, wherein, when a through hole is formed in the workpiece by abrasion working, a laser light of plural pulses having very great spatial and time energy density and emitted from a laser oscillator for oscillating the laser light at a pulse emitting time smaller than 1 pico-second is used, and the laser beam is illuminated from an outer surface side of the workpiece in which the through hole is formed by the laser abrasion working, thereby working the workpiece by focus-projecting a through hole working pattern onto the outer surface of the workpiece.

(53) A laser working method according to (52), wherein a plurality of through holes are simultaneously formed at a predetermined interval by illuminating the laser light through a mask having a plurality of opening patterns formed at a predetermined pitch.

(54) A laser working method for effecting optical abrasion working by illuminating a laser beam from a laser oscillator continuously emitting light pulses having great spatial and time energy density at a pulse emitting time smaller than 1 pico-second onto a workpiece, wherein three-dimensional working of a cone shape having working section continuously changed from a second configuration to a first configuration is effected by illuminating the laser beam emitted from the laser oscillator onto the workpiece under predetermined energy density and predetermined aperture number at a projection focus point of a predetermined mask pattern through the mask pattern having the second configuration different from the first configuration which is a beam section configuration at a non-focus point of the laser beam.

(55) A laser working method according to (54), wherein the first configuration which is the beam section configuration at the non-focus point of the laser beam is formed by using a polygonal pupil image pattern of a projection lens.

(56) A laser working method according to (54), wherein the first configuration which is the beam section configuration at the non-focus point of the laser beam is formed by using a polygonal stop pattern of a projection lens.

(57) A laser working method according to (54), wherein the beam section configuration is a substantially polygonal configuration, and the three-dimensional working of a spiral cone shape spirally changed continuously while increasing a sectional area of the section configuration of the workpiece from the predetermined configuration to the polygonal configuration is effected by illuminating the beam section configuration onto the workpiece while rotating the beam section configuration around an optical axis, at the projection focus point of the mask patten through the mask pattern having the second configuration.

(58) A laser working method according to (57), wherein the spiral cone shape is formed as a spiral cone shape having a substantially polygonal bottom configuration gradually and smoothly twisted continuously.

(59) A laser working method according to (57) or (58), wherein the spiral cone shape is worked by forming the polygonal configuration of the beam section configuration at the non-focus point of the laser beam by using the polygonal pupil image pattern of the projection lens and by rotating the pupil image pattern around the optical axis in connection with a working advancing direction of the workpiece.

(60) A laser working method according to (57) or (58), wherein the spiral cone shape is worked by forming the polygonal configuration of the beam section configuration at the non-focus point of the laser beam by using the polygonal stop pattern of the projection lens and by rotating the stop pattern around the optical axis in connection with a working advancing direction of the workpiece.

(61) A laser working method according to any one of (54) to (60), wherein the focus point is set at a surface side of the workpiece directed toward the illumination side of the laser beam or at a position spaced apart from the surface side of the workpiece directed toward the illumination side of the laser beam, whereby the three-dimensional working of the cone shape is effected.

(62) A laser working method according to any one of (52) to (61), wherein a wavelength of the laser light is within a range from 350 nm to 1000 nm.

(63) A laser working method according to any one of (52) to (62), wherein a pulse emitting time of the laser light is 500 femto-seconds or less.

(64) A laser working method according to any one of (52) to (63), wherein the workpiece is formed from Si or Si compound.

(65) A laser working method according to any one of (52) to (64), wherein the laser oscillator has a space compressing device for light propagation.

(66) A laser working method according to (65), wherein the space compressing device for light propagation is constituted by chirping pulse generating means, and longitudinal mode synchronizing means utilizing a light wavelength dispersing property.

DETAILED DESCRIPTION OF THE PREFERRED EMBODIMENTS

Figure 1:
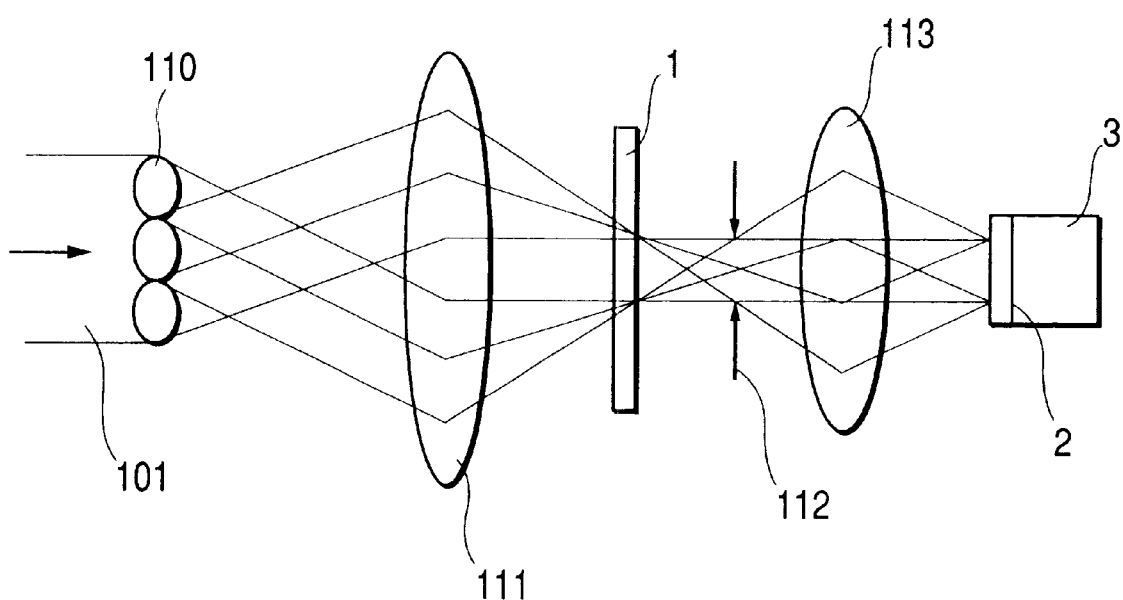
FIG. 1 is a schematic view showing optical paths of a mask pattern projection optical system of a laser working apparatus according to a first embodiment of the present invention.

In the present invention, a laser light of plural pulses having very great spatial and time energy density and emitted from a laser oscillator for oscillating the laser light at a pulse emitting time smaller than 1 pico-second is used. The laser is a so-called femto-second laser described in "Next Generation Optical Technology Collection" (1992; Optronics K.K.; first part element technique; generation and compression of super-short light pulse; 24 to 31 pages). Among presently available femto-second lasers, there is a laser having pulse emitting time smaller than 150 femto-seconds and optical energy of 500 mJ/pulse. According to this, energy density of radiated laser beam becomes about 3 GW.

In the present invention, by adopting the above-mentioned arrangement by using the femto-second laser, a light wavelength of the laser beam emitted at the oscillation time smaller than 1 pico-second is not necessarily ultraviolet ray, and, so long as a wavelength can be absorbed by a workpiece, visual light or infrared ray may be used. By using such wavelength, since time optical energy density is very great, the material is sublimated for a short time, with the result that abrasion working without liquid phase is permitted. Further, a projection lens having bright numerical aperture (NA) can be used, and material used in an orifice plate as the workpiece is not limited to resin material. For example, even when material having high heat conductivity such as ceramics or metals is used, since the working process is finished before heat diffusion is progressed from the start of light illumination, it is possible to obtain abrasion working without liquid phase. Further, even when material having high light permeability such as quartz, optical crystal or glass is used, since energy time concentration is great, even if light absorbing ability is low, the abrasion working is permitted.

That is to say, heretofore, although the working material has been used for forming ink discharge ports, ink flow paths, ink liquid chamber or ink supply port of an ink jet recording head, even not only resin material such as polyimide, but also inorganic material, glass material, metallic material or semi-conductor material is used, since such material can be subjected to the abrasion working of laser, degree of freedom of selection of material can be obtained with respect to a member for forming the ink discharge ports. Thus, high temperature heat treatment can be used for water repelling process of the surface of the ink discharge port.

Further, when material having small thermal expansion is used, it is possible to prevent deviation in interfaces between the members due to shearing force, and, if an ink jet recording head manufactured by such material having small thermal expansion is transported by a ship passing directly under the equator, since the thermal deformation can be prevented, transporting cost can be reduced. Further, when the ceramic material or glass material is used, an ink jet recording head having excellent endurance and storing ability which is not corroded by strong alkali of ink can be obtained.

In an embodiment of the present invention, by adopting the above-mentioned arrangement by using the femto-second laser, it is possible to form the tapered ink discharge ports by illuminating the laser beam from a surface side of the orifice plate. Thus, the ink discharge ports can be formed in a final process after the ink jet recording head is assembled, with the result that a conventional problem regarding non-isotropy in the ink discharge nozzle direction caused by deformation during the assembling and bonding of the orifice plate in the conventional techniques can be solved. Further, since the partially or totally tapered configuration can be obtained by illuminating the laser beam in this way, the discharging direction of the ink droplet is stabilized (to one direction) to reduce fluid resistance of the ink flow, thereby improving the flow velocity, with the result that, even when the same driving source is used, ink discharge frequency can be enhanced to enhance the ink flying speed thereby to improve the print quality remarkably and to permit high speed printing.

Further, in another embodiment of the present invention, by adopting the above-mentioned arrangement by using the femto-second laser, for example, the ink discharge port can be worked as a cone shape in which a section configuration at an ink discharge side of the port is a circular or elliptical portion and a section configuration at an ink supply side is a substantially cone shape portion smoothly connected to the ink supply path. As a result, configuration continuity between the ink supply path and the ink discharge port can be improved, with the result that the liquid ink can be flown in a substantially laminar flow condition and the dot placement ability can be stabilized, thereby suppressing dispersion in dot placement positions to achieve high accurate dot placement. Further, generation of mist can be suppressed.

Further, for example, a spiral cone shape having a substantially polygonal bottom configuration in the nozzle section configuration can be worked by the laser, with the result that the liquid ink droplet can have a rotational component around an axis of the flying direction. Thus, the liquid ink droplet can stably be flown by the rotational inertia force, thereby suppressing dispersion in dot placement positions to achieve high accurate dot placement. Further, generation of mist can be suppressed.

Further, in a further embodiment of the present invention, by adopting the above-mentioned arrangement by using the femto-second laser, for example, the ink discharge port of the ink jet recording head can be formed as a configuration in which a cone-shaped portion flared toward the laser beam illumination side is connected to a cone-shaped portion flared toward the opposite direction with a rotational symmetrical axis in common. As a result, by forming ink liquid interface in the interior of the ink discharge port by liquid surface tension of ink, clogging of the ink discharge ports due to drying of ink can be prevented by applying a cap to the ink discharge ports in such a manner that the cap is not contacted with the ink. Further, by forming a discontinuous surface boundary at a boundary between an ink hydrophilic area flared toward the ink supply side and an ink repelling area flared toward the ink discharge side, the flying ink droplet can be separated at the discontinuous surface boundary, with the result that both a main droplet and a satellite droplet of the ink droplet can be flown along the symmetrical axis of the ink discharge port, thereby obtaining high accurate print quality.

Further, according to the above-mentioned arrangement, since the area flared toward the ink discharge side has a configuration flared toward the ink discharge surface side of the ink discharge port forming member at a predetermined angle and not having a discontinuous corner portion regarding the ink liquid interface (unlike to a stepped portion), even if the ink mist is adhered to the area flared toward the ink discharge side, since the ink mist is not accumulated and grown in such a corner portion and is not contacted with the ink liquid interface, the flying of the ink droplet is not obstructed.

Further, depending upon the installation direction of the ink jet recording head, so long as the ink discharge side is directed to a gravity force vector direction, the ink mist adhered to the area flared toward the ink discharge side is flown and removed from the ink discharge surface of the ink discharge port forming member.

Further, if the ink discharge side is directed to a direction opposite to the gravity force vector direction, the ink mist flows toward the ink liquid interface in a minute mist condition and is absorbed therein. In this case, regarding the flying of the ink droplet, since the adhered ink is a small amount of mist, there is substantially no obstruction. Accordingly, in the area flared toward the ink discharge side, since there is no corner portion discontinuous to the ink liquid interface, the ink contamination can always be prevented. Thus, the print quality of the ink jet recording head is not deteriorated and the reliability and durability of the ink jet recording head can be improved.

Further, by making the area flared toward the ink supply side to have the spiral configuration, the ink droplet can have the rotational component around the axis of the flying direction, with the result that the ink droplet can stably be flown by the rotational inertia force, thereby suppressing dispersion in dot placement positions to achieve high accurate dot placement.

Now, embodiments of the present invention will be described.

[First embodiment]

FIG. 1 is a schematic view showing optical paths of a mask pattern projection optical system of a laser working apparatus using the femto-second laser according to a first embodiment of the present invention.

In FIG. 1, luminous flux 101 emitted from a main body of a short pulse oscillation laser (not shown) is introduced into an optical integrator 110 such as a fly-eye lens, where the incident luminous flux (light beam) is divided into a plurality of flux parts, and the divided luminous flux parts are overlapped on a mask 1 by a field lens 111 to correct illumination intensity of laser to become substantially uniform, thereby illuminating the mask.

Further, the field lens 111 serves to define a Koehler illumination system by projecting spot images collected to plural points by the fly-eye lens 110 on a stop 112 of a mask pattern projection lens 113. In such an optical system, the laser beam is illuminated onto the mask 1, and a mask pattern formed on the mask 1 is projected and focused onto a surface of an orifice plate (workpiece) of an ink jet recording head 3 by the projection focusing lens 113. And, the ink discharge port is worked by laser oscillation.

Figure 2:
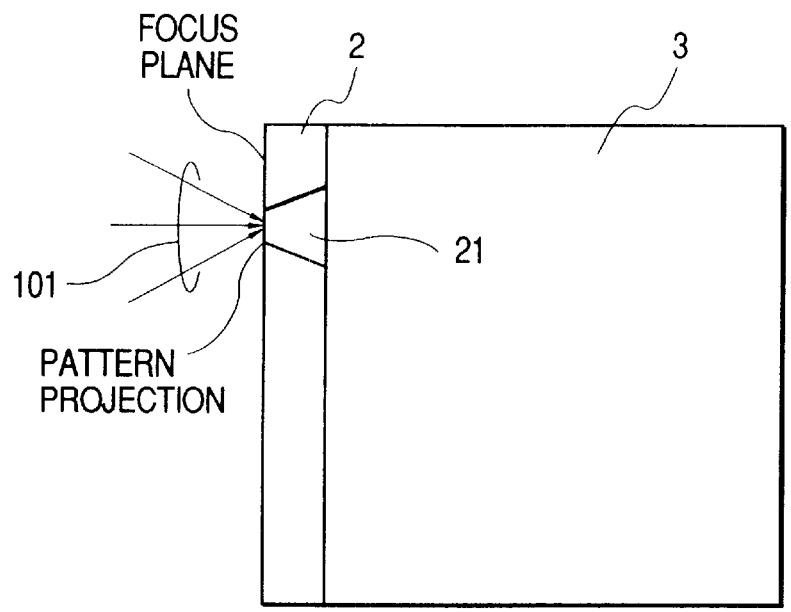
FIG. 2 is a schematic view for explaining formation of inverted taper configuration in the first embodiment.

Namely, as shown in FIG. 2, the orifice plate is made of polysulfone having low light absorbing rate of about 2% regarding laser oscillation wavelength of 775 nm, and the short pulse laser light 101 focuses and projects the mask image at a position on the outer surface of the orifice plate 2, and the numerical aperture (NA) of the projection lens is bright to project the mask image with NA=0.3, and energy density of the illumination laser is very high and the laser oscillation pulse time is 150 femto-seconds and the laser oscillation energy per pulse is 800 µJ. In this case, by illuminating the mask with 1 mJ/cm$^2$/pulse (per unit pulse per unit area illuminated on the orifice plate), when it is assumed that an absorbing rate of material of the workpiece with respect to the illumination laser wavelength is a, numerical aperture (NA) of an optical system for projecting the working pattern onto the orifice plate at a side of the workpiece is n, energy per unit oscillation pulse per a unit area of the laser beam illuminated on the orifice plate as the workpiece is E (unit: (J/cm$^2$/pulse)), and a time width of the oscillation pulse of the laser is t (unit: (sec)), regarding the following condition formula:

$$(a \times n \times E)/t > 13 \times 10^6 \ (W/cm^2)$$

left item becomes $(0.02 \times 0.3 \times 0.001)/(150 \times 10^{-15}) = 40 \times 10^6$ (W/cm$^2$), which satisfies the above condition formula. In this case, the orifice plate as the workpiece is worked substantially along the laser advancing direction, and, as shown in FIG. 2, a tapered ink discharge port tapered toward the outer surface of the orifice plate can be formed.

[Second embodiment]

Figure 3:
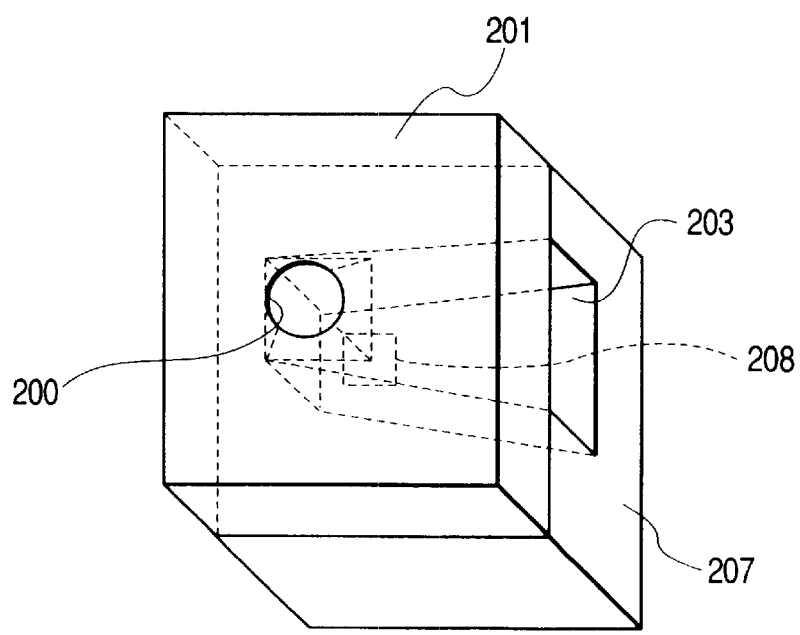
FIG. 3 is a schematic view of an ink discharge port according to a second embodiment of the present invention.

FIG. 3 is a schematic view showing an ink discharge port portion according to a second embodiment of the present invention.

In FIG. 3, an ink discharge port 200 formed in thickness of an orifice plate 201 has a circular form at an ink discharge side of the orifice plate 201 and a square form at a side of an ink supply path 203.

In an ink jet recording head of face discharge type according to the second embodiment, the ink discharge port 200 disposed above an ink discharge pressure generating element is connected to a wall of the ink supply path 203 formed in an ink supply path forming member 207 to smoothly flow the ink.

Next, an ink discharging operation of the ink jet recording head according to the illustrated embodiment will be explained with reference to FIGS. 4A to 4C and FIGS. 5D to 5F.

Figure 4A:
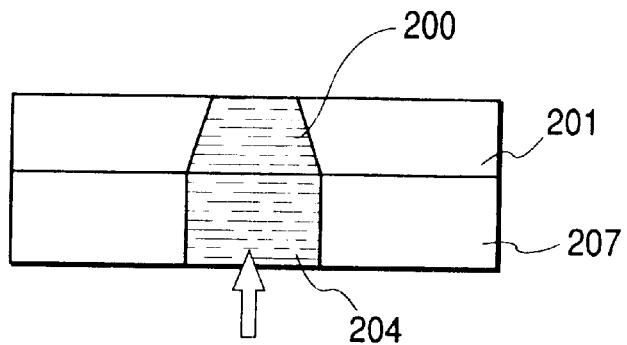
FIGS. 4A, 4B and 4C are views for explaining an ink droplet flying from the ink discharge port of an ink jet recording head according to the second embodiment.

First of all, as shown in FIG. 4A, by filling or loading the ink in the ink jet recording head (not shown), the ink 204 is disposed in contact with the orifice plate 201 including the ink discharge port 200 having the circular form at the ink discharge side of the orifice plate 201 and the square form at the ink supply side.

Since the ink 204 is aqueous solution, the ink is filled up to the ink supply path forming member 207 which is hydrophilic and the side surface of the ink discharge port 200 of the orifice plate 201 by a capillary force, and the ink is not adhered to the ink discharge side surface of the orifice plate 201 having a water repelling film (not shown) due to a water repelling action.

Figure 4B:
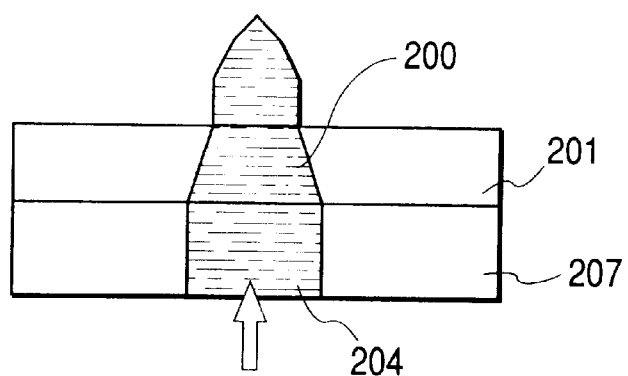

Then, as shown in FIG. 4B, by the pressure (directing toward a direction shown by the arrow) generated by the ink discharge pressure generating element of the ink jet recording head (not shown), the ink 204 is urged toward the atmosphere. In this case, in the arrangement according to the illustrated embodiment, since the side surface of the ink discharge port 200 is smoothly connected to the wall of the ink supply path forming member 207, when the ink flows, turbulent flow is hard to be created, with the result that the ink is pushed out toward the atmosphere as a laminar flow.

Figure 4C:
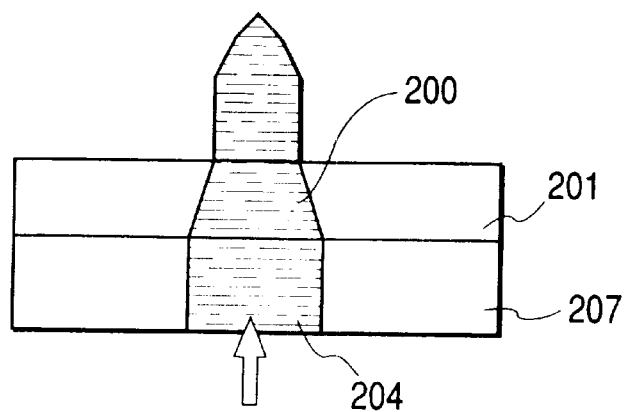

Then, as shown in FIG. 4C, the pushed out ink 204 is subjected to push-out growth, and, since the energy is minimized due to surface tension of the ink, the ink starts to be transferred to a spherical form.

Figure 5D:
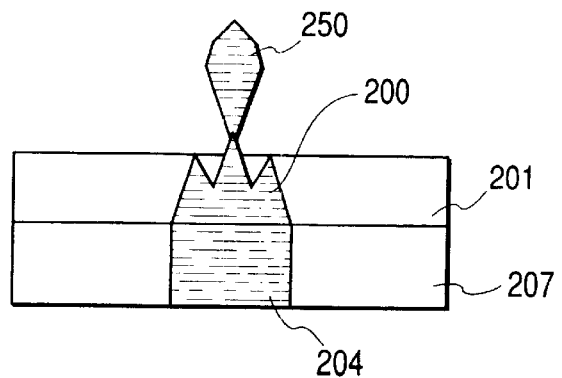
FIGS. 5D, 5E and 5F are views for explaining an ink droplet flying from the ink discharge port of the ink jet recording head according to the second embodiment, following to FIGS. 4A, 4B and 4C.

Then, as shown in FIG. 5D, the pressure generated by the ink discharge pressure generating element of the ink jet recording head (not shown) is stopped, and the ink 204 is flying by its own inertia force while growing in the spherical form.

Figure 5E:
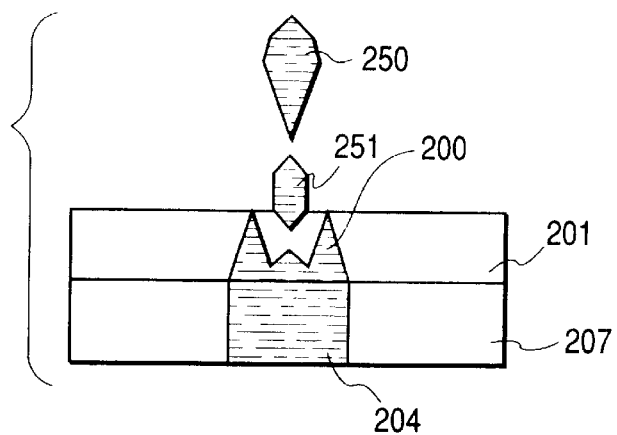

Then, as shown in FIG. 5E, the ink 204 is divided into a main droplet 250 and a satellite droplet 251 by balance between a length of the ink during the spherical deformation and the surface tension. At the same time, at an ink discharge side edge of the orifice plate 201 which is a boundary between the hydrophilic area and the water repelling area, the ink is broken uniformly and symmetrically, and the ink droplet is separated from the ink jet recording head.

Figure 5F:
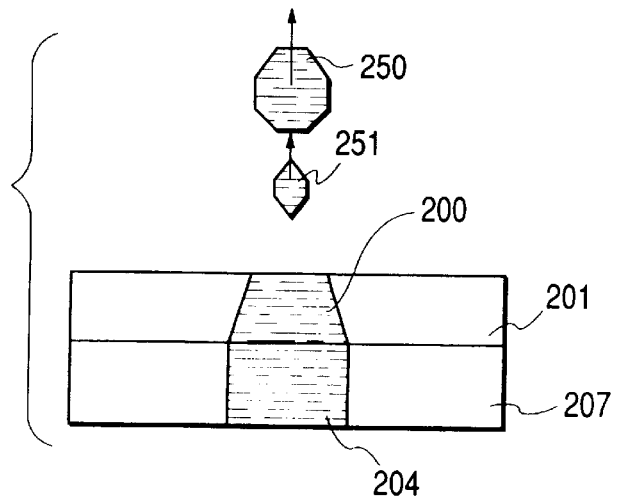

Then, as shown in FIG. 5F, the main droplet 250 and the satellite droplet 251 of the separated ink droplet are flown in the same direction (shown by the arrow) which is an axial direction of the ink discharge port.

Next, a method for working or forming the ink discharge port of the orifice plate having the circular form at the ink discharge side and the square cone-shaped section configuration at the ink supply side according to the illustrated embodiment will be explained with reference to the accompanying drawings.

Figure 6:
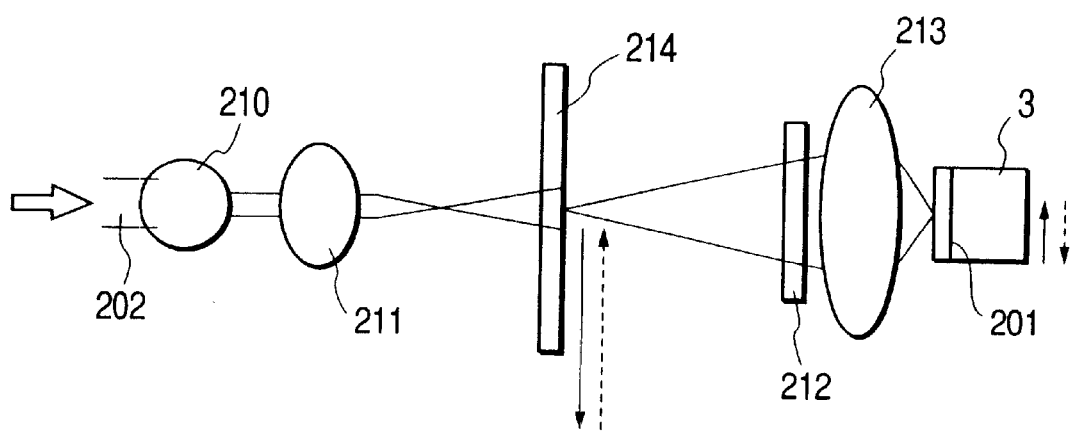
FIG. 6 is an schematic optical view of an apparatus for manufacturing the ink jet recording head according to the second embodiment.

FIG. 6 is a schematic optical view of a laser working apparatus for working. the ink discharge port according to the illustrated embodiment.

Figure 7:
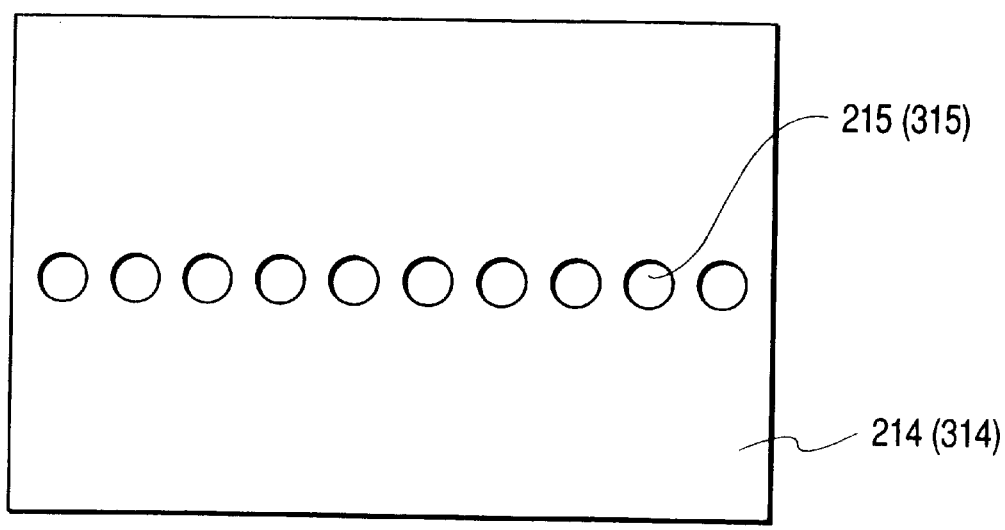
FIG. 7 is a pattern view of a photo-mask used in second and third embodiments of the present invention.

Laser luminous flux 202 emitted (toward a direction shown by the bold arrow in FIG. 6) from a main body of a short pulse oscillation laser is directed to a zoom beam compressor 210, where the luminous flux is converted into a predetermined light beam diameter which is in turn directed to a mask illumination lens 211, where a laser beam having predetermined converging angle is formed, thereby illuminating a part of a mask pattern portion 215 of a mask 214 shown in FIG. 7. In this case, effective NA (numerical aperture) for ultimately working the workpiece is determined by compression ratio of the zoom beam compressor 210 and a focal distance of the mask illumination lens 211 by the worked configuration of the work piece.

A taper angle of the workpiece is determined by the numerical aperture (NA). In other words, the compression ratio of the zoom beam compressor 210 and the focal distance of the mask illumination lens 211 are determined or adjusted.

Figure 8:
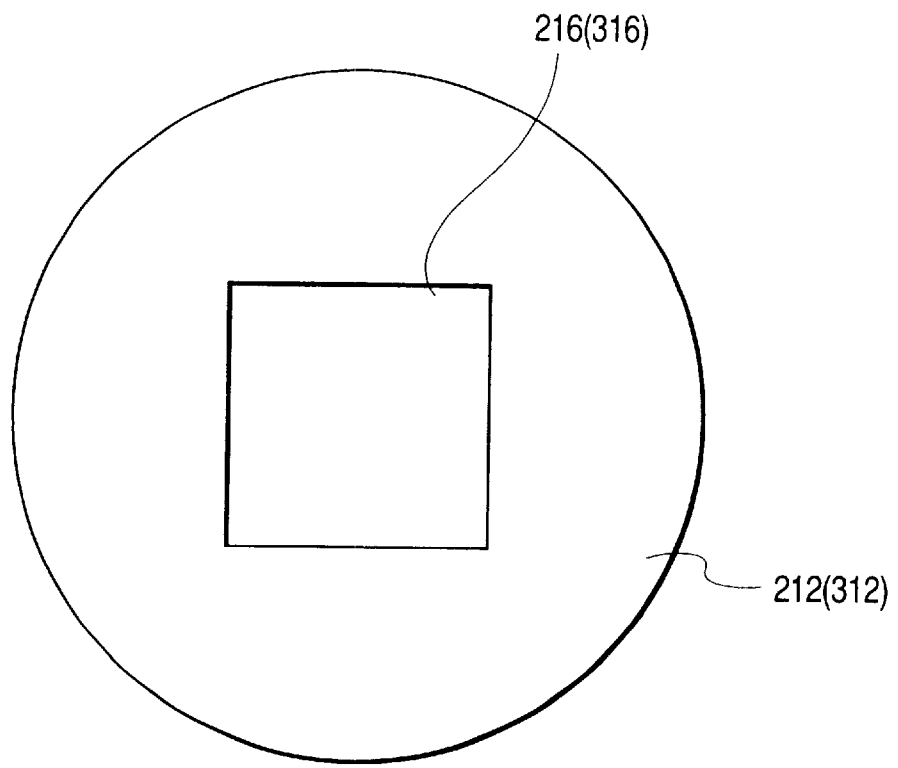
FIG. 8 is a pastern view of a light bundle stop used in the second and third embodiments.

Then, the laser light passed through the mask pattern 215 of the mask 214 shown in FIG. 7 passes through a square pattern of an opening portion 216 of a luminous flux stop 212 shown in FIG. 8, with the result that the laser luminous flux is converted into a substantially square beam, so that a pattern image is focus-projected onto the surface of the orifice plate 201 as the workpiece, thereby working the ink discharge port by laser oscillation.

By making the beam section configuration of the laser luminous flux to have a square form and by making the mask pattern to have a circular form, a configuration having a circular form at the focus point and a substantially square form at the non-focus point can be obtained. That is to say, by setting the focus point at the surface side of the workpiece (illumination side of the laser luminous flux), a cone shape having a section configuration flared from the ink discharge side (substantially square form connected to the circular section configuration) to the ink supply side can be formed. Further, when the orifice plate alone is worked from the ink supply side, by setting the focus point at a position on the ink discharge side surface of a back surface of the orifice plate, a cone shape having a section configuration converged from the ink supply side (substantially square form) to the ink discharge side can be formed.

Further, even when the above-mentioned arrangement in which the stop 212 is disposed in the vicinity of the projection lens 213 is not used, by using the Koehler illumination system, the similar working can be effected by arranging the luminous flux stop or the light image at a different position of the laser light path to project the pupil image on the projection lens and by making the pupil image of the projection lens 213 to have a square form or any form.

At the same time as illumination of the laser light, the mask 214 and the main body 3 of the ink jet recording head 3 including the orifice plate 201 as the workpiece are shifted by mechanical stages (not shown) at predetermined speed in synchronous with each other in a direction perpendicular to the optical axis (shown by the thin arrow) or in directions (shown by the thin arrow and the broken line arrow; reciprocal movement), thereby working the entire mask pattern 215.

[Third embodiment]

Figure 9:
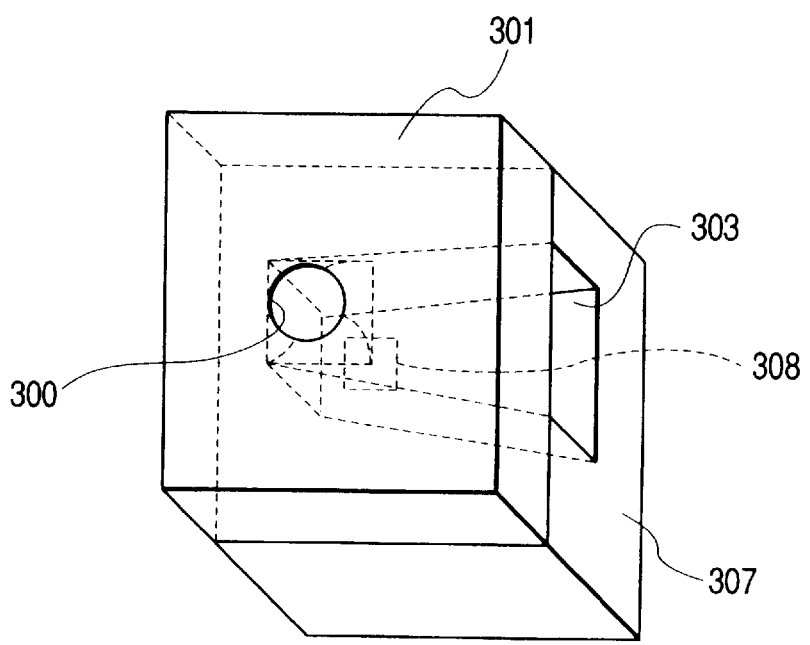
FIG. 9 is a schematic view of an ink discharge port according to the third embodiment.

FIG. 9 is a schematic view showing an ink discharge port portion according to a third embodiment of the present invention.

In FIG. 9, an ink discharge port 300 formed in thickness of an orifice plate 301 has a circular form at an ink discharge side of the orifice plate 301 and a square form at a side of an ink supply path 303 to which the ink is supplied and has a continuous spiral cone shape gradually and smoothly twisted.

In an ink jet recording head of face discharge type according to the second embodiment, the ink discharge port 300 disposed above an ink discharge pressure generating element is connected to a wall of the ink supply path 303 formed in an ink supply path forming member 307 to smoothly flow the ink.

Next, an ink discharging operation of the ink jet recording head according to the illustrated embodiment will be explained with reference to FIGS. 10A to 10C and FIGS. 11D to 11F.

Figure 10A:
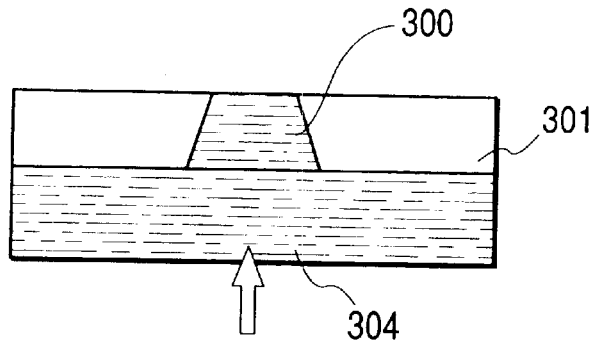
FIGS. 10A, 10B and 10C are views for explaining an ink droplet flying from the ink discharge port of an ink jet recording head according to the third embodiment.

First of all, as shown in FIG. 10A, by filling or loading the ink in the ink jet recording head (not shown), the ink 304 is disposed in contact with the orifice plate 301 including the ink discharge port 300 having the circular form at the ink discharge side of the orifice plate 301 and the square form at the ink supply side.

Since the ink 304 is aqueous solution, the ink is filled up to the side surface of the ink discharge port 300 of the orifice plate 301 which is hydrophilic by a capillary force, and the ink is not adhered to the ink discharge side surface of the orifice plate 301 having a water repelling film (not shown) due to a water repelling action.

Figure 10B:
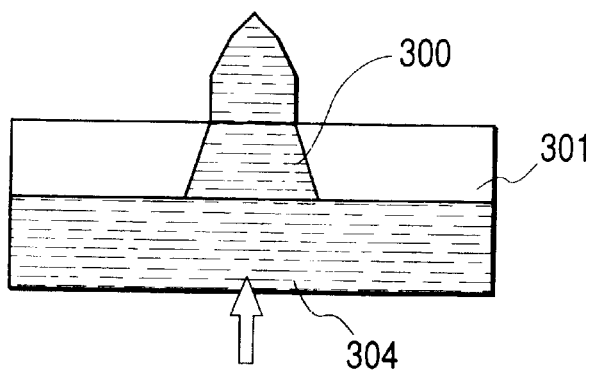

Then, as shown in FIG. 10B, by the pressure (directing toward a direction shown by the arrow) generated by the ink discharge pressure generating element of the ink jet recording head (not shown), the ink 304 is urged toward the atmosphere. In this case, since the ink discharge port 300 has the spiral configuration, the ink is subjected to the fluid resistance along the spiral pattern, with the result that, when the ink flows, since a rotational force around an axis of the ink discharging direction is applied to the ink, the ink droplet is pushed out toward the atmosphere while being rotated.

Figure 10C:
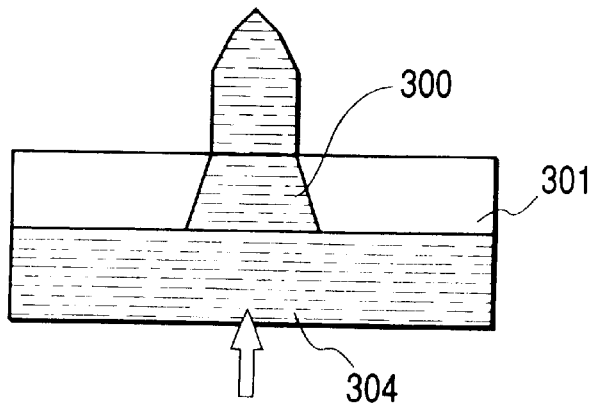

Then, as shown in FIG. 10C, the pushed-out ink 304 is subjected to push-out growth, and, since the energy is minimized due to surface tension of the ink 304, the ink starts to be transferred to a spherical form.

Figure 11D:
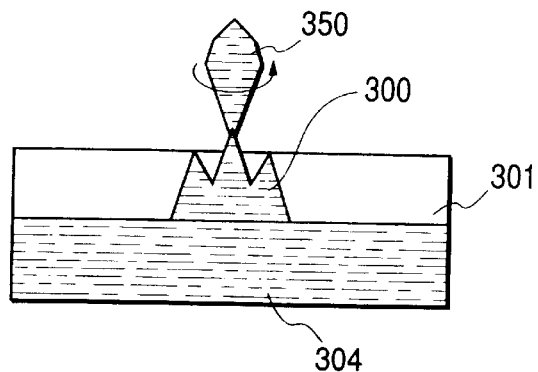
FIGS. 11D, 11E and 11F are views for explaining an ink droplet flying from the ink discharge port of the ink jet recording head according to the third embodiment, following to FIGS. 10A, 10B and 10C.

Then, as shown in FIG. 11D, the pressure generated by the ink discharge pressure generating element of the ink jet recording head (not shown) is stopped, and the ink 304 is flying by its own inertia force while growing the spherical form.

Figure 11E:
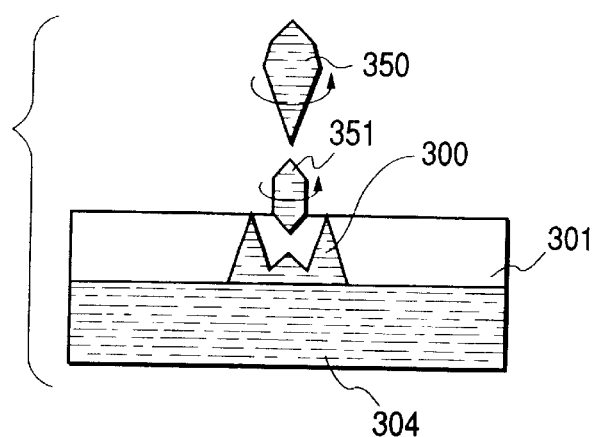

Then, as shown in FIG. 11E, the ink 304 is divided into a main droplet 350 and a satellite droplet 351 by balance between a length of the ink during the spherical deformation and the surface tension. At the same time, at an ink discharge side edge of the orifice plate 301 which is a boundary between the hydrophilic area and the water repelling area, the ink is broken uniformly and symmetrically, and the ink droplet is separated from the ink jet recording head.

Figure 11F:
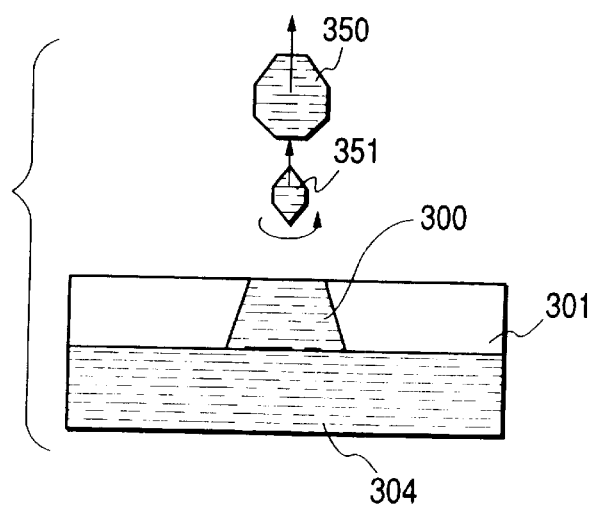

Then, as shown in FIG. 11F, the main droplet 350 and the satellite droplet 351 of the separated ink droplet are flown in the same direction (shown by the arrow) which is an axial direction of the ink discharge port. In this case, since the both the main droplet 350 and the satellite droplet 351 are flown while being rotated, similar to the principle of bullet of a pistol, the ink droplets are remain the flying direction vector due to the rotational inertia, with the result that the ink droplets are stably advanced, thereby suppressing dispersion in the dot placement positions to achieve high accurate dot placement.

Next, a method for working or forming the ink discharge port of the orifice plate 301 having the circular form at the ink discharge side and the square form at the ink supply path 303 side and having the continuous spiral cone shape gradually and smoothly twisted according to the illustrated embodiment will be explained with reference to the accompanying drawings.

Figure 12:
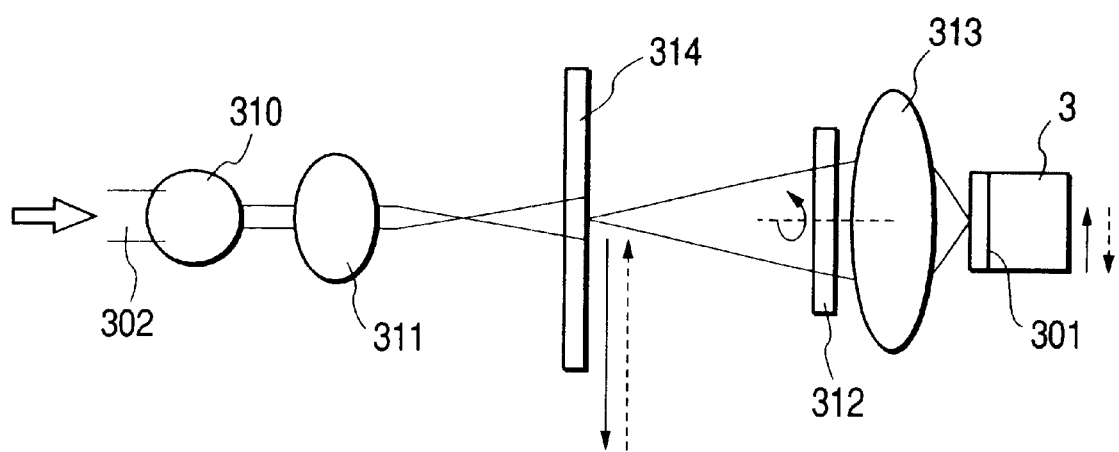
FIG. 12 is an schematic optical view of an apparatus for manufacturing the ink jet recording head according to the third embodiment.

FIG. 12 is a schematic optical view of a laser working apparatus for working the ink discharge port according to the illustrated embodiment.

Laser luminous flux 302 emitted (toward a direction shown by the bold arrow in FIG. 12) from a main body of a short pulse oscillation laser is directed to a zoom beam compressor 310, where the luminous flux is converted into a predetermined light beam diameter which is in turn directed to a mask illumination lens 311, where a laser beam having predetermined converging angle is formed, thereby illuminating a part of a mask pattern portion 315 of a mask 314 shown in FIG. 7. In this case, effective NA (numerical aperture) for ultimately working the workpiece is determined by compression ratio of the zoom beam compressor 310 and a focal distance of the mask illumination lens 311. A taper angle of the workpiece is determined by the numerical aperture (NA). In other words, the compression ratio of the zoom beam compressor 310 and the focal distance of the mask illumination lens 311 are determined or adjusted by the worked configuration of the workpiece.

Then, the laser light passed through the mask pattern 315 of the mask 314 shown in FIG. 7 passes through a square pattern of an opening portion 316 of a luminous flux stop 312 shown in FIG. 8, with the result that the laser luminous flux is converted into a substantially square beam, so that a pattern image is focus-projected onto the surface of the orifice plate 301 as the workpiece, thereby working the ink discharge port by laser oscillation while rotating the luminous flux stop 312 around the optical axis in synchronous with the advancement of the workpiece.

By making the beam section configuration of the laser luminous flux to have a square form and by making the mask pattern to have a circular form, a configuration having a circular form at the focus point and a substantially square form at the non-focus point can be obtained, and at the same time, since the square beam section configuration of the laser luminous flux is rotated around the optical axis, the spiral cone configuration can be formed. That is to say, by setting the focus point at the surface side of the workpiece (illumination side of the laser luminous flux) and by illuminating the beam section configuration onto the workpiece while rotating it around the optical axis at a predetermined rotational angle, a spiral cone shape flared from the circular section configuration at the ink discharge side to the square section configuration at the ink supply side can be formed. Further, when the orifice plate alone is worked from the ink supply side, by setting the focus point at a position on the ink discharge side surface of a back surface of the orifice plate, a spiral cone shape having a section configuration converged from the ink supply side (substantially square form) to the ink discharge side can be formed.

Further, even when the above-mentioned arrangement in which the stop 312 is disposed in the vicinity of the projection lens 313 is not used, by using the Koehler illumination system, the similar working can be effected by arranging the luminous flux stop or the light image at a different position of the laser light path to project the pupil image on the projection lens and by making the pupil image of the projection lens 313 to have a square form or any form.

At the same time as illumination of the laser light, the mask 314 and the main body 3 of the ink jet recording head 3 including the orifice plate 301 as the workpiece are shifted by mechanical stages (not shown) at predetermined speed in synchronous with each other in a direction perpendicular to the optical axis (shown by the thin arrow in FIG. 6) or in directions (shown by the thin arrow and the broken line arrow; reciprocal movement), thereby working the entire mask pattern 315.

[Fourth embodiment]

FIGS. 13A to 13C and FIGS. 14D to 14F are schematic views showing an ink discharge port portion according to a fourth embodiment of the present invention.

An ink discharging operation of an ink jet recording head having a configuration in which a cone shape flared toward the ink discharge side is connected to a cone shape flared toward the ink supply side with a rotational symmetrical axis in common according to the fourth embodiment will be briefly explained with reference to FIGS. 13A to 13C and FIGS. 14D to 14F.

Figure 13A:
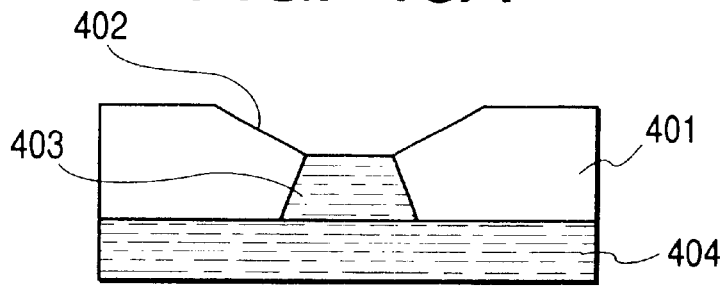
FIGS. 13A, 13B and 13C are views for explaining an ink droplet flying from an ink discharge port of an ink jet recording head according to a fourth embodiment of the present invention.

First of all, as shown in FIG. 13A, by filling or loading the ink in the ink jet recording head (not shown), the ink 404 is disposed in contact with an orifice plate 401 including an ink discharge port having an area 402 flared toward the ink discharge side and an area 403 flared toward the ink supply side.

Since the ink 404 is aqueous solution, the ink is filled up to the area 403 flared toward the ink supply side which is hydrophilic by a capillary force, and the ink is not adhered to the area 402 flared toward the ink discharge side having a water repelling film (not shown) due to a water repelling action.

Figure 13B:
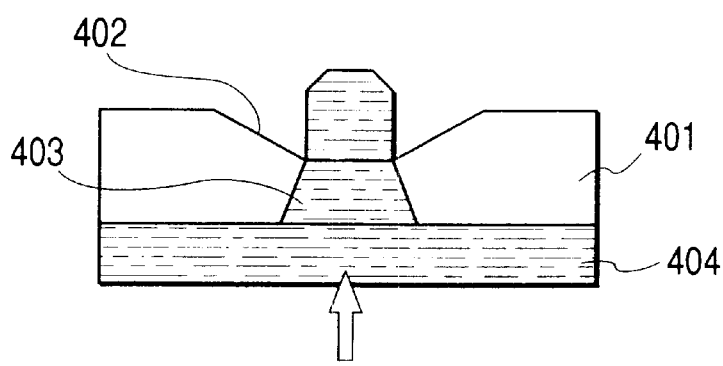

Then, as shown in FIG. 13B, by the pressure (directing toward a direction shown by the arrow) generated by the ink discharge pressure generating element of the ink jet recording head (not shown), the ink 404 is urged toward the atmosphere.

Figure 13C:
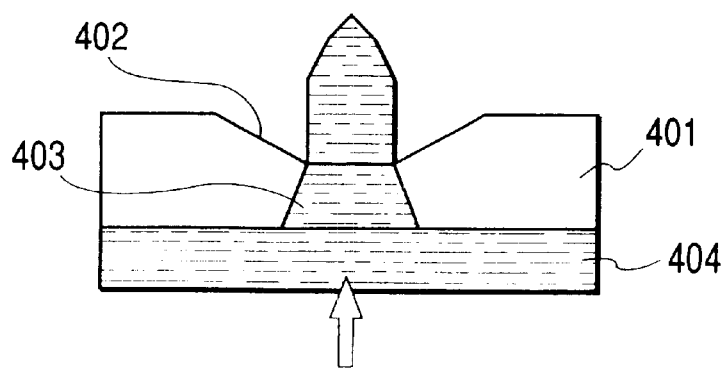

Then, as shown in FIG. 13C, the pushed-out ink 404 is subjected to push-out growth, and, since the energy is minimized due to surface tension of the ink, the ink starts to be transferred to a spherical form.

Figure 14D:
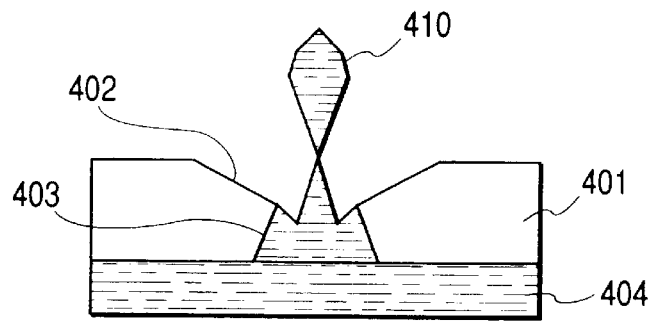
FIGS. 14D, 14E and 14F are views for explaining an ink droplet flying from the ink discharge port of the ink jet recording head according to the fourth embodiment, following to FIGS. 10A, 10B and 10C.

Then, as shown in FIG. 14D, the pressure generated by the ink discharge pressure generating element of the ink jet recording head (not shown) is stopped, and the ink 404 is flying by its own inertia force while growing the spherical form.

Figure 14E:
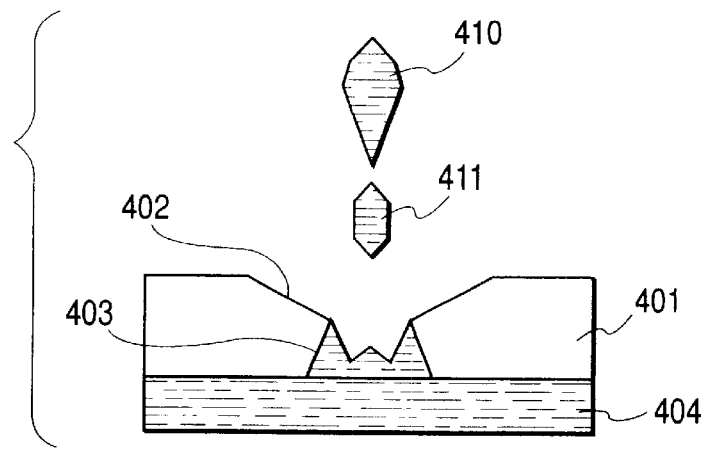

Then, as shown in FIG. 14E, the ink 404 is divided into a main droplet 410 and a satellite droplet 411 by balance between a length of the ink during the spherical deformation and the surface tension. At the same time, at a boundary (which is a boundary between the hydrophilic area and the water repelling area) between the area 402 flared toward the ink discharge side and the area 403 flared toward the ink supply side, the ink is broken uniformly and symmetrically, and the ink droplet is separated from the ink jet recording head.

Figure 14F:
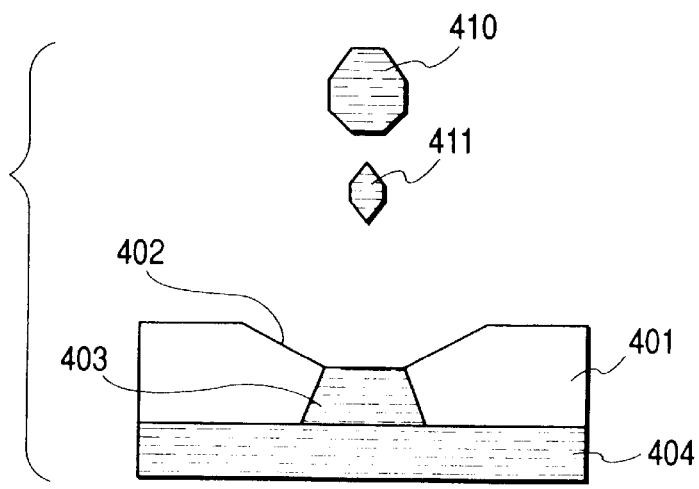

Then, as shown in FIG. 14F, the main droplet 410 and the satellite droplet 411 of the separated ink droplet are flown in the same direction (shown by the arrow) which is an axial direction of the ink discharge port.

Figure 15:
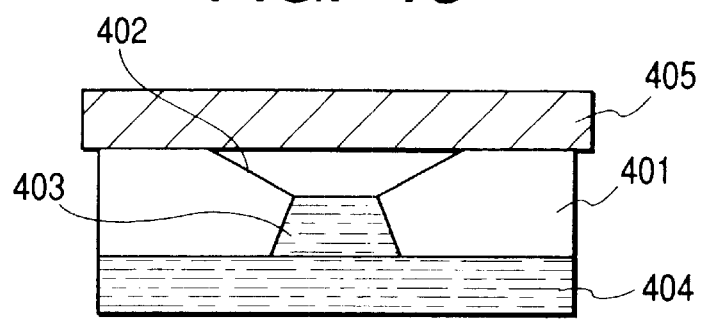
FIG. 15 is a view showing an arrangement of a cap for preventing drying of ink from the ink discharge port of the ink jet recording head according to the fourth embodiment.

Next, a cap for preventing ink from drying through the ink discharge port of the ink jet recording head according to the illustrated embodiment will be explained. When the ink jet recording head is not operated, moisture in the ink solution is vaporized into the atmosphere, and density of non-vaporized substance in the ink solution is increased, thereby clogging the ink discharge ports. To avoid this, when the ink jet recording head is not operated, a cap 405 as shown in FIG. 15 is closely contacted with the surface of the orifice plate including the ink discharge ports, thereby preventing the contact between the ink discharge ports and the atmosphere. In this case, the ink 404 is not contacted with the cap 405.

Next, prevention of ink mist contamination of the ink discharge port portion of the ink jet recording head according to the illustrated embodiment will be explained with reference to FIGS. 16A and 16B.

Figure 16A:
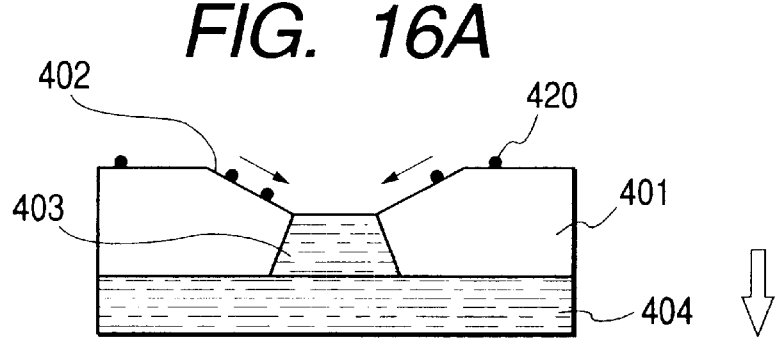
FIGS. 16A and 16B are views for explaining ink mist contamination prevention at the ink discharge port of the ink jet recording head according to the fourth embodiment.

As shown in FIG. 16A, when a gravity force acts toward a direction shown by the bold arrow, ink mist particles 420 at the ink discharge port portion are slid in direction shown by the thin arrows due to the water repelling effect of the inclined surface (with the water repelling film) of the area 402 flared toward the ink discharge side and is absorbed in the ink 404 in the ink discharge port. As a result, since the ink mist particles 420 are hard to be combined with each other to form a great ink lump, thereby not affecting a bad influence upon the ink discharging.

Figure 16B:
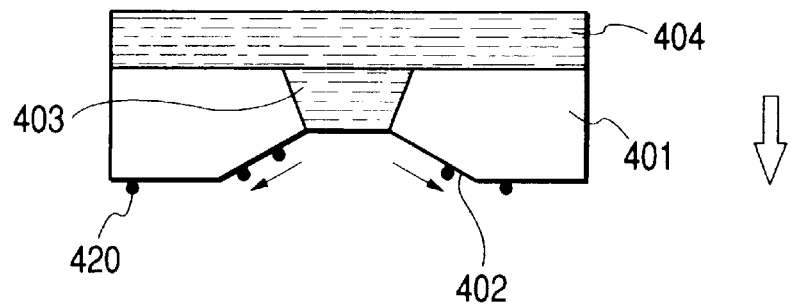

On the other hand, as shown in FIG. 16B, when the gravity force acts toward a direction shown by the bold arrow, ink mist particles 420 at the ink discharge port portion are slid on the inclined surface (with the water repelling film) of the area 402 flared toward the ink discharge side in directions shown by the thin arrows due to the water repelling effect and leaves the ink discharge port. Thus, a bad influence is not affected upon the ink discharging.

Figure 17A:
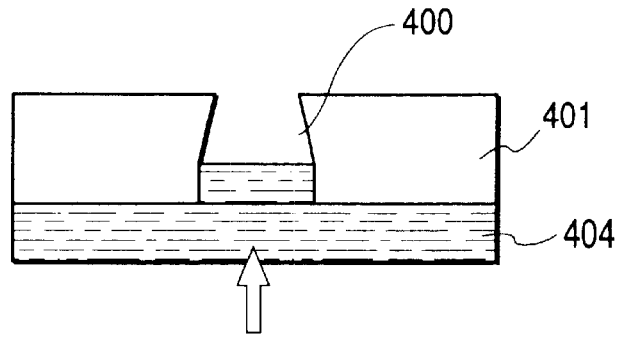
FIGS. 17A, 17B and 17C are views for explaining an ink droplet flying from an ink discharge port of a conventional ink jet recording head.

Next, an ink discharging operation of a conventional ink jet recording head in which a water repelling film is provided within an ink discharge port will be explained with reference to FIGS. 17A to 17C and FIGS. 18D to 18F. First of all, as shown in FIG. 17A, by filling or loading the ink in the ink jet recording head (not shown), the ink 404 is disposed in contact with an orifice plate 401 including the ink discharge port 400 having the water repelling effect therewithin. Since the ink 404 is aqueous solution, the ink is filled up to the hydrophilic area by a capillary force, and the ink is not adhered to the area having the water repelling film (not shown) due to a water repelling action.

Figure 17B:
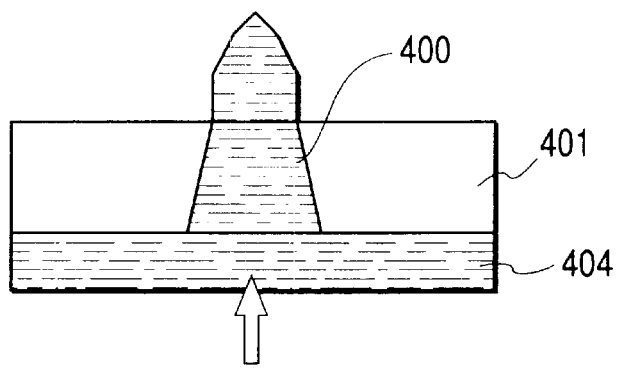

Then, as shown in FIG. 17B, by the pressure (directing toward a direction shown by the arrow) generated by the ink discharge pressure generating element of the ink jet recording head (not shown), the ink 404 is urged toward the atmosphere.

Figure 17C:
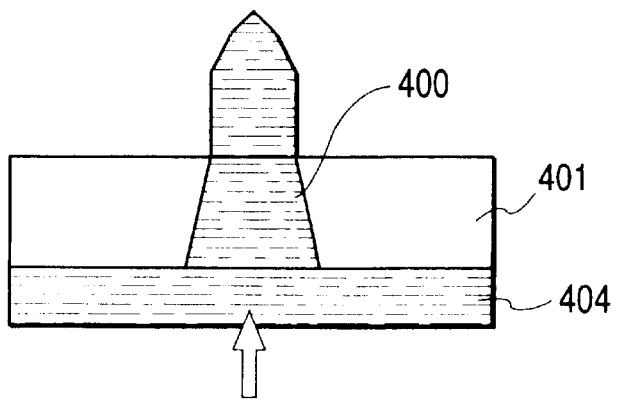

Then, as shown in FIG. 17C, the pushed-out ink 404 is subjected to push-out growth, and, since the energy is minimized due to surface tension of the ink 404, the ink starts to be transferred to a spherical form.

Figure 18D:
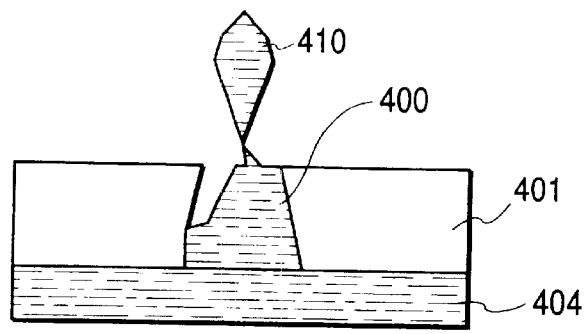
FIGS. 18D, 18E and 18F are views for explaining an ink droplet flying from the ink discharge port of the conventional ink jet recording head, following to FIGS. 17A, 17B and 17C.

Then, as shown in FIG. 18D, the pressure generated by the ink discharge pressure generating element of the ink jet recording head (not shown) is stopped, and the ink 404 is flying by its own inertia force while growing the spherical form. However, the ink 404 is adhered to a part of the water repelling film of the ink discharge port 400 due to the van der Waals force, thereby creating asymmetrical liquid flow.

Figure 18E:
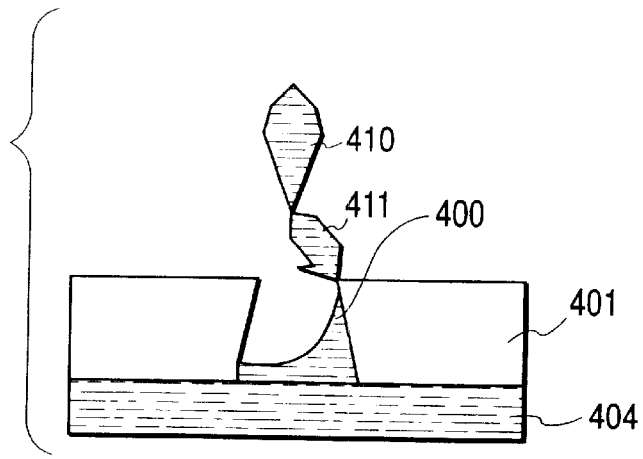

Then, as shown in FIG. 18E, the ink 404 is divided into a main droplet 410 and a satellite droplet 411 by balance between a length of the ink during the spherical deformation and the surface tension. At the same time, the satellite droplet 411 having the asymmetrical liquid flow created by the van der Waals force is advanced while being resisted by the wall of the ink discharge port 400, and the ink is broken, and the ink droplet is separated from the ink jet recording head.

Figure 18F:
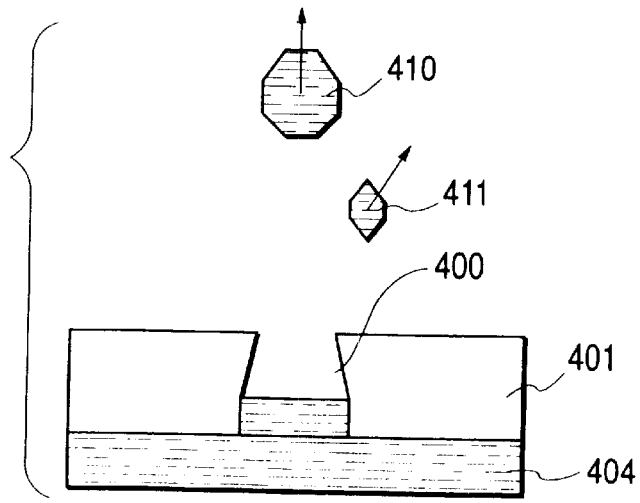

Then, as shown in FIG. 18F, the main droplet 410 and the satellite droplet 411 of the separated ink droplet are flown in the directions shown by the arrows. In this case, the main droplet 410 is flying along an axial direction of the ink discharge port, but the satellite droplet is flying in a different direction.

Figure 19:
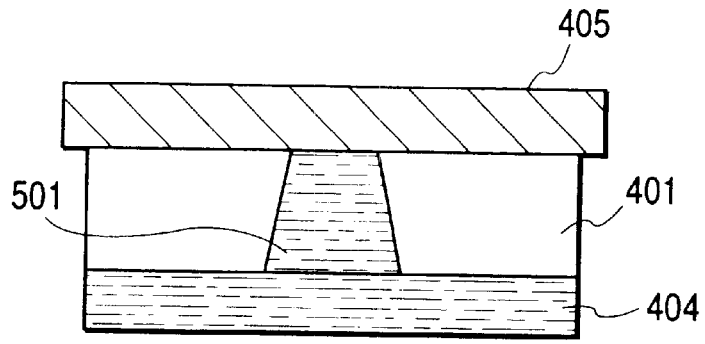
FIG. 19 is a view showing an arrangement of a cap for preventing drying of ink from the ink discharge port of the conventional ink jet recording head.

Next, a cap for preventing ink from drying through an ink discharge port of a conventional ink jet recording head in which ink liquid interface is formed on the surface of the ink discharge port will be explained with reference to FIG. 19.

In this case, since the ink 404 is contacted with a cap 405, the ink 404 is absorbed in the interface between the surface of the orifice plate 401 and the cap 405. In this case, in order to closely contact the cap, close contact following the ink discharge surface is required. However, since rubber material or urethane materials is apt to be degraded by alkali of the ink, the cap material is degraded and is adhered to the ink discharge port, thereby changing the ink flying direction.

Next, ink mist contamination of a conventional ink jet recording head in which a spot-facing stepped portion is formed around an ink discharge port will be explained with reference to FIGS. 20A and 20B.

Figure 20A:
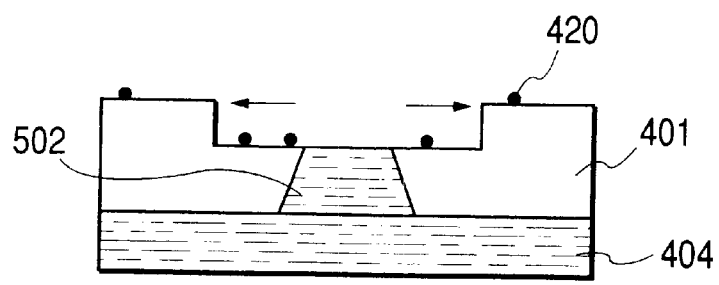
FIGS. 20A and 20B are views for explaining ink mist contamination prevention at the ink discharge port of the conventional ink jet recording head.
Figure 20B:
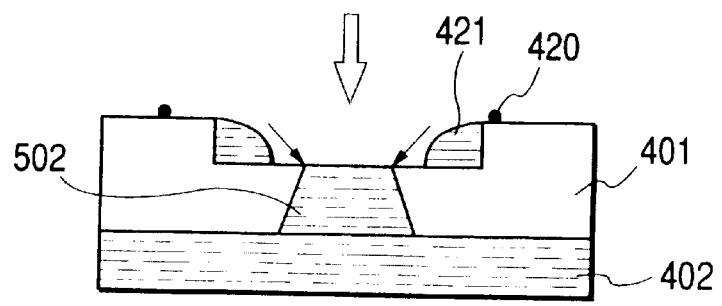

As shown in FIGS. 20A and 20B, ink mist particles 420 in the vicinity of the ink discharge port portion are shifted toward and accumulated in a corner of the spot-facing stepped portion having the water repelling film. If the liquid amount in the corner exceeds a predetermined amount, the mist ink is contacted with the ink liquid interface, and is shifted toward directions shown by the arrows in FIG. 20B by surface tension and is absorbed in the ink 404 within the ink discharge port. In this case, since a large amount of ink flows-in, poor ink discharging may occur or the ink discharging direction may be changed, thereby affecting a bad influence upon the ink discharging.

Next, a method for manufacturing the ink discharge port portion of the ink jet recording head according to the illustrated embodiment will be briefly explained with reference to FIGS. 21A to 21C and FIGS. 22D and 22E.

Figure 21A:
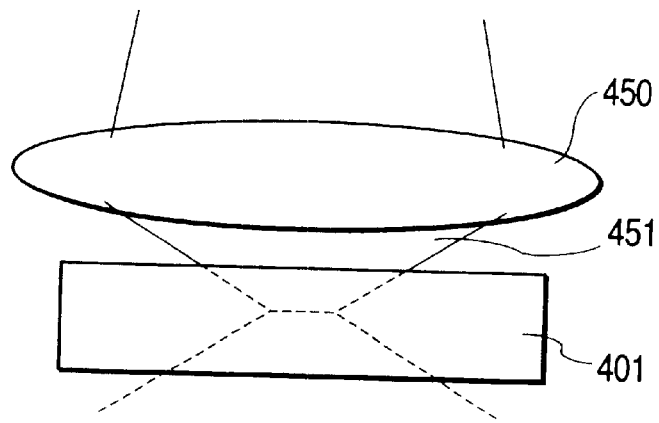
FIGS. 21A, 21B and 21C are views for explaining steps for manufacturing the ink discharge port portion of the ink jet recording head according to the fourth embodiment.

First of all, as shown in FIG. 21A, by using the laser light 151 emitting from the laser oscillator for outputting the laser light with pulse emitting time smaller than 1 pico-second, the predetermined pattern image of the mask pattern (not shown) is illuminated with predetermined energy density and predetermined numerical aperture (NA) onto the orifice plate 401 at a predetermined focus point within the orifice plate 401.

Figure 21B:
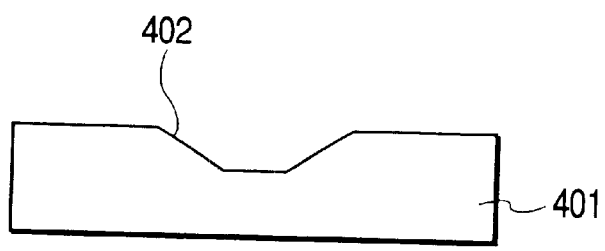

Then, as shown in FIG. 21B, an area flared toward the ink discharge side is formed by the laser illumination working.

Figure 21C:
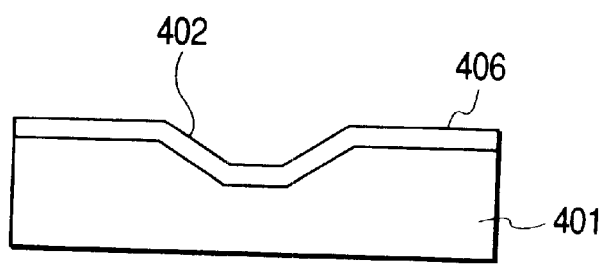

Then, as shown in FIG. 21C, a water repelling film 406 having a predetermined thickness is coated by a coating device such as micro-spray.

Figure 22D:
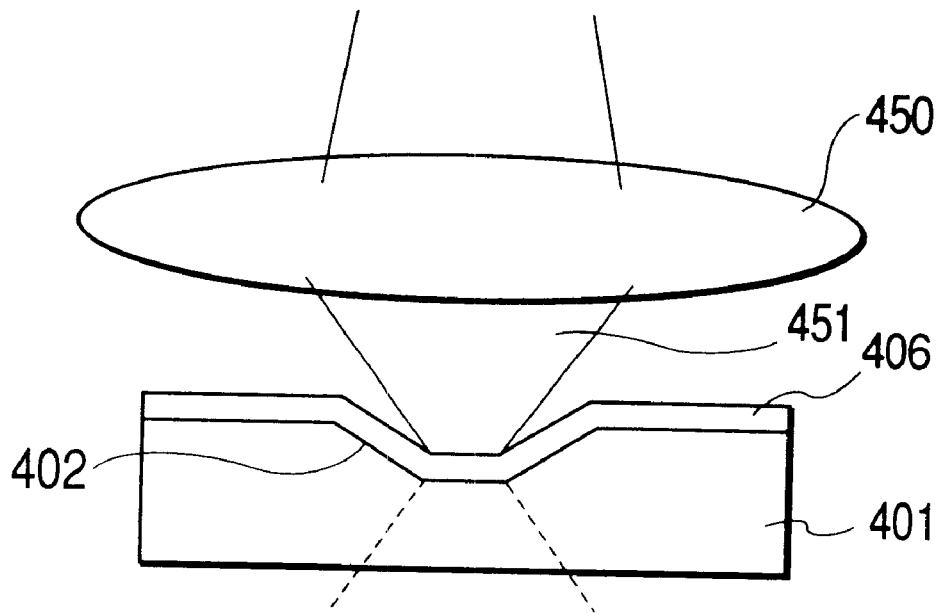
FIGS. 22D and 22E are views for explaining steps for manufacturing the ink discharge port portion of the ink jet recording head according to the fourth embodiment, following to FIGS. 21A, 21B and 21C.

Then, as shown in FIG. 22D, similar to FIG. 21A, by using the laser light 451 emitted from the laser oscillator for outputting the laser light with pulse emitting time smaller than 1 pico-second, the predetermined pattern image of the mask pattern (not shown) is illuminated with predetermined energy density and predetermined numerical aperture (NA) onto the orifice plate 401 having the water repelling film 406 at a predetermined focus position of the water repelling area within the orifice plate 401.

Figure 22E:
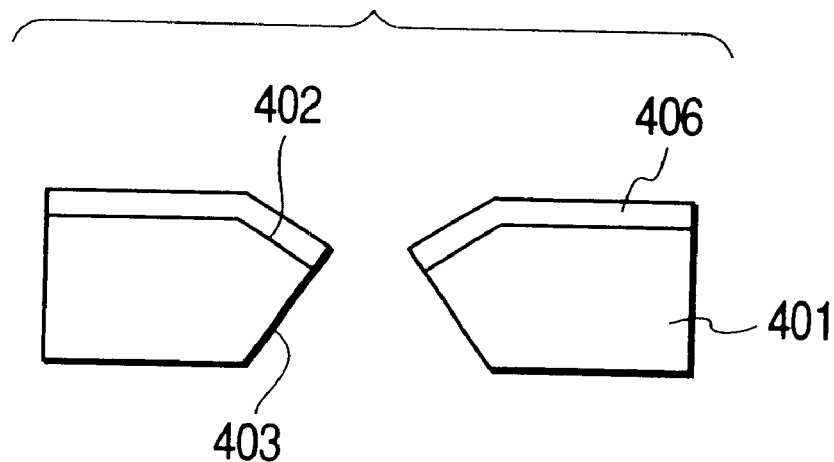

Then, as shown in FIG. 22E, the area 403 flared toward the ink supply side is formed by the laser illumination working.

When the area 402 flared toward the ink discharge side or the area 403 flared toward the ink supply side is formed as a polygonal pyramid configuration, the working is performed by making the beam section configuration of the laser beam to have a polygonal shape. In this case, the polygonal shape of the beam section configuration of the laser beam can be formed, for example, by using a polygonal pupil pattern of a projection lens or by using a polygonal stop pattern of a projection lens. Further, in order to form the cone shape of the ink discharge port as the spiral cone shape, the working can be performed by illuminating the beam section configuration of the laser beam onto the workpiece while rotating it around the optical axis.

Next, an ink jet recording head to which the working methods according to the first to fourth embodiments are applied will be explained with reference to FIGS. 23A to 23C.

Figure 23A:
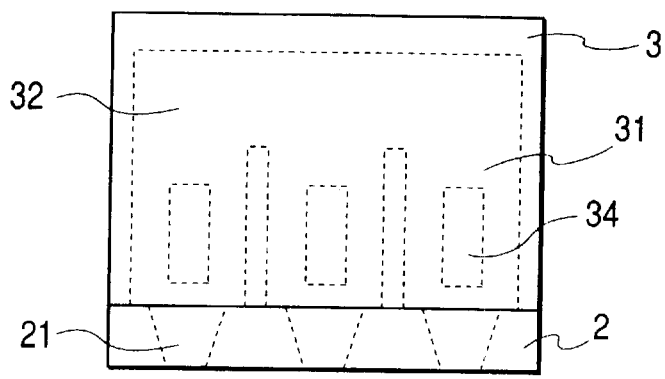
FIGS. 23A, 23B and 23C are schematic views showing an ink jet head manufactured by an ink jet head manufacturing method to which the working method according to the fourth embodiment is applied.
Figure 23B:
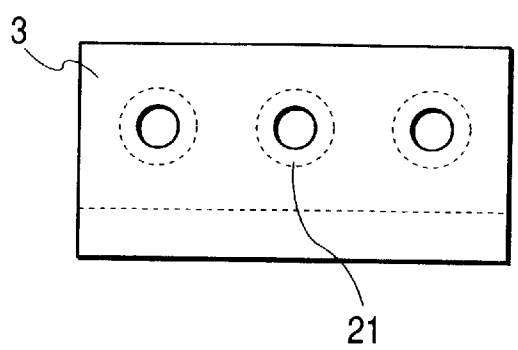
Figure 23C:
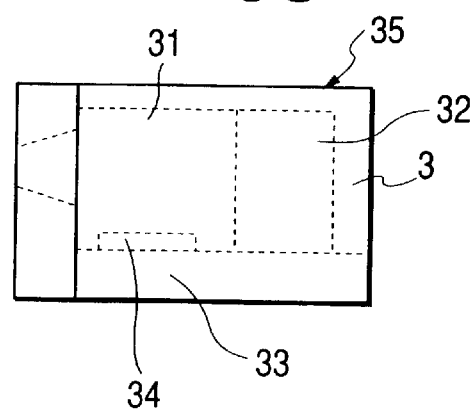

In FIGS. 23A to 23C, ink discharge pressure generating elements 34 such as electrical/thermal converting elements or electrical/mechanical converting elements for discharging the ink are provided on a substrate 33.

The ink discharge pressure generating element 34 is disposed within respective ink flow paths 31 communicated with corresponding ink discharge ports 21, and the ink flow paths 31 are communicated with a common liquid chamber 32.

The common liquid chamber 32 is provided with an ink supply tube (not shown) through which the ink is supplied from an ink tank.

A top plate 33 has recessed portions for forming the ink flow paths 31 and the common liquid chamber 32. When the top plate is joined to the substrate 33, the ink flow paths 31 and the common liquid chamber 32 are defined.

Further, a discharge port plate (referred to as "orifice plate" hereinafter) 2 having the ink discharge ports 21 is attached to an ink flow path end side of an assembly of the substrate 33 and the top plate 35.

Such an ink jet recording head can be manufactured in the following manner.

That is to say, the substrate 33 is formed by patterning heaters (ink discharge pressure generating element) 34, an integrated circuit such as shift registers (not shown) and electric wiring on a silicon substrate, and the top plate 35 is formed by forming recessed portions (ink flow paths 31 and ink liquid chamber 32) and an ink supply opening (not shown) by chemical etching.

Thereafter, the substrate 33 and the top plate 35 are aligned with each other and are joined together so that the ink discharge side end surfaces are aligned and the ink flow paths 31 and the heaters 34 are aligned.

After the joining, the orifice plate 2 in which the nozzles are not yet formed is adhered to the ink discharge side end surfaces of the joined top plate and substrate, and, in this condition, the nozzles are formed by the above-mentioned ink discharge port working method.

Thereafter, an electric substrate on which heater driving terminals (not shown) are patterned is connected, and an aluminum base plate is joined to the substrate 33. Then, holders for holding various members and the ink tank for ink supply are connected. In this way, the ink jet recording head is assembled.

By manufacturing the ink jet recording head in this way, it is possible to prevent the change in ink discharging direction due to dispersion in orientation of the ink discharge ports.

As a result that the ink jet recording heads were manufactured in accordance with the above-mentioned embodiments and the configurations of the ink discharge ports were observed, it was found that the edge of each of the ink discharge ports was formed clearly and the ink discharge ports aligned with high density in parallel were formed dispersion in port diameters at the ink discharge end was considerably reduced in comparison with the conventional techniques. Further, as a result that the printing was actually performed by using such ink jet recording heads, it was found that the print dots uniformly aligned were recorded and each dot configuration was sharp and clear, thereby obtaining excellent print quality.

Incidentally, in the first to fourth embodiments, while an example that the ink discharge ports are formed was explained, the present invention is not limited to such an example, ink flow paths, an ink liquid chamber and ink supply opening may be worked by the present invention with similar technical effect.

Further, while the ink jet recording head was explained, the present invention is not limited to the ink jet recording head, but the present invention can be applied, for example, to laser working in micro-machining of a semi-conductor substrate.

As mentioned above, according to the present invention, an ink jet recording head manufacturing method, an ink jet recording head manufactured by such a method and a laser working method, in which a configuration symmetrical with respect to the axis of the ink discharging direction and totally tapered toward outside can be formed by the laser working from the outside (from the ink discharge side) of the ink discharge port forming plate can be realized.

Further, according to the present invention, when it is assumed that an absorbing rate of material of the workpiece with respect to the illumination laser wavelength is a, numerical aperture (NA) of an optical system for projecting the working pattern onto the orifice plate at a side of the workpiece is n, energy per unit oscillation pulse per a unit area of the laser beam illuminated on the orifice plate as the workpiece is E (unit: (J/cm$^2$/pulse)), and a time width of the oscillation pulse of the laser is t (unit: (sec)), by satisfying the following relationship:

$$(a \times n \times E)/t > 13 \times 10^6 (W/cm^2)$$

since the time energy density is greatly increased by the laser for emitting the laser beam with pulse emitting time smaller than 1 pico-second, the workpiece such as resin can be subjected to abrasion working with small light energy, and, by using visual light or near infrared ray, a projection lens having bright numerical aperture (NA) can easily be utilized because various optical material can be used, and, the ink discharge port tapered toward the outer surface of the orifice plate can easily be manufactured by the laser illumination from the outside of the orifice plate. Thus, high quality working can be performed, thereby improving the performance of the ink jet recording head remarkably.

Further, according to the present invention, the working material is not limited to resin material, but, even when ceramic material metallic material having high heat conductivity is used, since the working process is finished before heat diffusion is advance from the start of the light illumination, it is possible to achieve the abrasion working without liquid phase condition, and, further, material having high light permeability such as quartz, optical crystal or glass is used, since the concentration of energy is high, even when such material has small light absorbing ability, abrasion working can be performed.

Further, according to the present invention, when the ceramic material or glass material is used, an ink jet recording head having excellent endurance and storing ability which is not corroded by strong alkali of ink can be obtained.

Further, according to the present invention, since the ink discharge port tapered toward the outer surface of the orifice plate can be formed, the ink discharge ports can be formed in the final step after the ink jet recording head is assembled, with the result that non-isotropy of the ink discharging direction caused by the deformation during the assembling of the ink discharge port forming plate can be eliminated. Further, since the taper configuration partially or totally tapered toward the outside (ink discharge side) of the ink discharge port forming plate can be formed, the discharging direction of the ink droplet is stabilized (to given direction) and the fluid resistance of the ink flow is reduced to improve the flow velocity, with the result that the ink discharge frequency is enhanced by the same driving source and the flying speed of the ink can be enhanced, thereby improving the print quality remarkably and permitting high speed printing.

Further, according to the present invention, by applying the laser working means for effecting three-dimensional working of the cone shape having section configuration continuously changed from the second configuration to the first configuration to the ink jet recording head manufacturing method or the ink jet recording head, the ink discharge port can be formed as the cone shape in which the section configuration at the ink discharge side is a circular form or elliptical form and the section configuration at the ink supply side is a substantially polygonal form smoothly connected to the ink supply path, thereby improving the configuration continuity between the ink supply path and the ink discharge port. Accordingly, the liquid ink can be flown in the laminar flow condition, with the result that the ink droplet can be flown stable, thereby suppressing dispersion in dot placement positions to achieve the excellent dot placement. Further, generation of mist can be reduced.

Further, according to the present invention, by applying the laser working means for working the spiral cone shape having the substantially polygonal bottom configuration to the ink jet recording head manufacturing method or the ink jet recording head, the ink droplet can have the rotational component around the axis of the flying direction, with the result that the ink droplet can stably be flown by the rotational inertia force, thereby suppressing dispersion in dot placement positions to achieve the excellent dot placement. Further, generation of mist can be reduced.

Further, according to the present invention, a configuration in which a cone-shaped portion flared toward the laser beam illumination side is connected to a cone-shaped portion flared toward the opposite direction with a rotational symmetrical axis in common can be worked. As a result, by applying such laser working means to the ink jet recording head manufacturing method or the ink jet recording head, the ink discharge port of the ink jet recording head can be formed as the configuration in which the cone-shaped portion flared toward the laser beam illumination side is connected to the cone-shaped portion flared toward the opposite direction with a rotational symmetrical axis in common.

Thus, in the present invention, by forming ink liquid interface in the interior of the ink discharge port by liquid surface tension of ink, clogging of the ink discharge ports due to drying of ink can be prevented by applying a cap to the ink discharge ports in such a manner that the cap is not contacted with the ink. Further, by forming a discontinuous surface boundary at a boundary between an ink hydrophilic area flared toward the ink supply side and an ink repelling area flared toward the ink discharge side, the flying ink droplet can be separated at the discontinuous surface boundary, with the result that both the main droplet and the satellite droplet of the ink droplet can be flown along the symmetrical axis of the ink discharge port, thereby obtaining high accurate print quality. Since there is no discontinuous corner portion regarding the ink liquid interface, even if the ink mist is adhered to the area flared toward the ink discharge side, since the ink mist is not accumulated and grown in such a corner portion and is not contacted with the ink liquid interface, the flying of the ink droplet is not obstructed. Further, when the ink discharge side is directed to a gravity force vector direction, the ink mist adhered to the area flared toward the ink discharge side is flown and removed from the ink discharge surface of the ink discharge port forming member. If the ink discharge side is directed to a direction opposite to the gravity force vector direction, the ink mist flows toward the ink liquid interface in a minute mist condition and is absorbed therein. In this way, the obstruction of the ink mist against the flying of the ink droplet is greatly eliminated, thereby improving the reliability and durability of the ink jet recording head.

What is claimed is:

1. A method for manufacturing an ink jet recording head in which an ink discharge port for discharging an ink droplet to be adhered to a recording medium, a liquid chamber for containing ink to be supplied to said ink discharge port, an ink flow path for communicating said ink discharge port with said liquid chamber, an energy generating element provided in said ink flow path and adapted to generate energy for discharging the ink and an ink supply opening for supplying the ink from exterior into said liquid chamber are formed by bonding or adhering plate members, wherein:

when an orifice plate in which said ink discharge port is formed is subjected to laser working, a laser light of plural pulses having very great spatial and time energy density and emitted from a laser oscillator for oscillating the laser light at a pulse emitting time smaller than 1 pico-second is used, and the laser beam is illuminated from an outer surface side of said orifice plate which is opposite to an ink supplying side thereby to form an ink discharge port working pattern on the outer surface of said orifice plate by focus projection.

2. A method for manufacturing an ink jet recording head according to claim 1, wherein a plurality of ink discharge ports are simultaneously formed at a predetermined interval by illuminating the laser light through a mask having a plurality of opening patterns formed at a predetermined pitch.

3. A method for manufacturing an ink jet recording head according to claim 1, wherein the member for forming said ink discharge port is formed from resin.

4. A method for manufacturing an ink jet recording head according to claim 1, wherein the member for forming said ink discharge port is formed from Si or Si compound.

5. A method for manufacturing an ink jet recording head according to claim 1, wherein a wavelength of the laser light is within a range from 350 nm to 1000 nm.

6. A method for manufacturing an ink jet recording head according to claim 1, wherein a pulse emitting time of the laser light is 500 femto-seconds or less.

7. A method for manufacturing an ink jet recording head according to claim 1, wherein energy density of the laser beam satisfies the following relationship:

$$(a \times n \times E)/t > 13 \times 10^6 \; (W/cm^2)$$

where, a is absorbing rate of material of workpiece with respect to the illumination laser wavelength, n is aperture number of an optical system for projecting the working pattern onto the workpiece at a side of the workpiece, E (unit: $(J/cm^2/pulse)$) is energy per unit oscillation pulse time per a unit area of the laser light illuminated on the material of the workpiece, and t (unit: (sec)) is time width of the oscillation pulse of said laser.

8. A method for manufacturing an ink jet recording head according to claim 1, wherein said laser oscillator has a space compressing device for light propagation.

9. A method for manufacturing an ink jet recording head according to claim 8, wherein said space compressing device for light propagation is constituted by chirping pulse generating means, and longitudinal mode synchronizing means utilizing a light wavelength dispersing property.

10. An ink jet recording head in which an ink discharge port for discharging an ink droplet to be adhered to a recording medium, a liquid chamber for containing ink to be supplied to said ink discharge port, an ink flow path for communicating said ink discharge port with said liquid chamber, an energy generating element provided in said ink flow path and adapted to generate energy for discharging the ink and an ink supply opening for supplying the ink from exterior into said liquid chamber are formed by bonding or adhering plate members, wherein:

said ink discharge port has a tapered section configuration in which a section configuration worked by focus-projecting an ink discharge port working pattern onto an outer surface of an orifice plate which is opposite to an ink supplying side by illuminating a laser light of plural pulses having very great spatial and time energy density and emitted from a laser oscillator for oscillating the laser light at a pulse emitting time smaller than 1 pico-second onto the outer surface of said orifice plate is tapered toward the outer surface of said orifice plate.

11. An ink jet recording head according to claim 10, wherein a plurality of ink discharge ports are formed at a predetermined interval.

* * * * *